US007122789B2

(12) United States Patent
Tan et al.

(10) Patent No.: US 7,122,789 B2
(45) Date of Patent: Oct. 17, 2006

(54) METHOD AND APPARATUS TO INCREASE IONIZATION EFFICIENCY IN AN ION SOURCE

(75) Inventors: Phillip V. Tan, Columbia, MD (US); Victor V. Laiko, Columbia, MD (US); Vadym Berkout, Rockville, MD (US); Vladimir M. Doroshenko, Ellicott City, MD (US)

(73) Assignee: Science & Engineering Services, Inc., Columbia, MD (US)

( * ) Notice: Subject to any disclaimer, the term of this patent is extended or adjusted under 35 U.S.C. 154(b) by 76 days.

(21) Appl. No.: 10/842,481

(22) Filed: May 11, 2004

(65) Prior Publication Data

US 2005/0253063 A1 Nov. 17, 2005

(51) Int. Cl.
*B01D 59/44* (2006.01)
*H01J 49/00* (2006.01)

(52) U.S. Cl. ....................................... 250/282; 250/288

(58) Field of Classification Search ................ 250/282, 250/288

See application file for complete search history.

(56) References Cited

U.S. PATENT DOCUMENTS 5,965,884 A 10/1999 Laiko et al.
6,744,041 B1 * 6/2004 Sheehan et al. ............ 250/283
6,791,080 B1 9/2004 Doroshenko et al.
6,806,468 B1 10/2004 Laiko et al.
6,949,739 B1 * 9/2005 Franzen ...................... 250/288

OTHER PUBLICATIONS

Phillip V. Tan, et al., Atmospheric Pressure MALDI With Pulsed Dynamic Focusing for High-Efficiency Transmission of Ions into a Mass Spectrometer, Analytical Chemistry, vol. 76, No. 9, 2004, pp. 2462-2469.

Victor V. Laiko, et al., Atmospheric Pressure Matrix-Assisted Laser Desorptio/Ionization Mass Spectrometry, Anal. Chem., vol. 72, No. 4, Feb. 15, 2000, pp. 652-657.

* cited by examiner

*Primary Examiner*—Jack Berman
*Assistant Examiner*—Jennifer Yantorno
(74) *Attorney, Agent, or Firm*—Oblon, Spivak, McClelland, Maier & Neustadt, P.C.

(57) ABSTRACT

A method and an apparatus for collecting ions in which ions are produced from a sample in an ion source. An electric field is provided that is more uniform in an area adjacent the sample than in an area adjacent an inlet to the ion transfer device or that is larger in field strength at the sample than at a point removed from the sample towards the inlet of the ion transfer device. Ions are received into the electric field and transferred through the ion transfer device to a sampling orifice of the mass spectrometer. The apparatus includes an ion transfer device coupled to a sampling orifice of a mass spectrometer. The ion transfer device has an inlet with a surface that extends in a direction from an axis of the ion transfer device. The ion transfer device can extend a distance of at least 10 times an inner diameter of a sampling orifice of the mass spectrometer.

74 Claims, 25 Drawing Sheets

FIG. 11

| Laser Irradiation Area ($mm^2$) | $\frac{I_{Planar\ Capillary}}{I_{Tapered\ Capillary}}$ |
|---|---|
| 0.25 | 2.7 |
| 0.51 | 2.0 |
| 0.72 | 1.7 |
| 1.06 | 1.3 |

FIG. 12

| Laser Irradiation Area [$mm^2$] | $\frac{I}{Area}$ [$mm^{-2}$] Tapered Capillary | $\frac{I}{Area}$ [$mm^{-2}$] Planar Capillary |
|---|---|---|
| $A_o = 0.25$ | 680 | 1830 |
| 0.51 | 1500 | 2930 |
| 0.72 | 2730 | 4560 |
| 1.06 | 4260 | 5700 |

FIG. 14

| Laser Irradiation Area ($mm^2$) | I std. deviation Tapered Capillary | I Std. deviation Planar Capillary |
|---|---|---|
| 0.25 | ±47 | ± 70 |
| 0.51 | ± 26 | ± 35 |
| 0.72 | ± 8 | ± 11 |
| 1.06 | ± 8 | ± 4 |

| Sampling Interface Configuration | I |
| --- | --- |
|  | 6600 |
|  | 8300 |

METHOD AND APPARATUS TO INCREASE IONIZATION EFFICIENCY IN AN ION SOURCE

CROSS-REFERENCE TO RELATED DOCUMENTS

This application is related to U.S. application Ser. No. 10/367,917 entitled "Method and Apparatus for Efficient Transfer of Ions into a Mass Spectrometer," filed on Feb. 19, 2003, the entire contents of which is incorporated herein by reference. This application is related to U.S. application Ser. No. 09/795,108 entitled "Capillary ion delivery device and method for mass spectroscopy," filed on Mar. 1, 2001, the entire contents of which is incorporated herein by reference. This application is related to U.S. Pat. No. 5,965,884 entitled "Atmospheric Pressure Matrix-Assisted Laser Desorption," issued Oct. 12, 1999, the entire contents of which is incorporated herein by reference.

DISCUSSION OF THE BACKGROUND

1. Field of the Invention

This invention relates in general to ion sources, and in particular to MALDI mass spectrometry ion sources especially with pulsed dynamic focusing.

2. Background of the Invention

Ionization of chemical species can be accomplished by a variety of methods including matrix-assisted laser desorption/ionization (MALDI), atmospheric pressure (AP)-MALDI, electrospray ionization (ESI), atmospheric pressure chemical ionization (APCI), field ionization, electron ionization, discharge and photoionization. These ionization techniques, when combined with an appropriate mass analyzer or ion mobility spectrometer, yield chemical and structural information about the molecules ionized. One goal of combining an ion source with an instrumental analyzer is to achieve a low limit of detection for a chemical species of interest (i.e., high sensitivity). Another goal is to acquire such information in the fastest time possible (i.e., high throughput).

One combination of ion source and spectrometer is an AP-MALDI mass spectrometry as described by Laiko et al. in Anal. Chem. 2000, 72:652–657; 72:5239–5243; and described in U.S. Pat. No. 5,965,884, the entire contents of which are incorporated herein by reference. As shown in FIG. 1, AP-MALDI system 2 uses a pulsed laser 4 for ionization, at ambient pressures, to create ions for analysis in a mass spectrometer 6. A capillary 8 is used in conventional AP-MALDI MS configurations to transfer ions from the sample target plate 10 (i.e., the ion source) to the mass spectrometer 6.

FIG. 2A is a diagram depicting an enlarged view of an AP-MALDI sampling interface configuration showing a tapered capillary 8, which is itself interfaced to the mass spectrometer 6 by a sampling orifice 9*b* to an inlet flange 9. The numbers depicted on the figures represent typical values for the dimensions used, and are not intended to specifically restrict the present invention. Capillaries (as shown for example in FIG. 1 and FIG. 2A) can be tapered.

Further, as shown in FIG. 2B, the sampling orifice 9*b* can utilize sharp tips. However, other sampling inlets 9, as shown in FIGS. 2C and 3, have been used, including arrangements as in FIG. 3 in which a non-parallel sample plate 10 is adjacent to the inlet flange 9. The non-parallel configuration permits laser irradiation to be aligned on-axis with the sampling interfaces, and illustrates one problem overcome by the use of extended capillaries, such as for example capillary 8 shown in FIG. 1, to provide better sample access.

Traditionally, samples were mounted on sample plates 10 and placed close to the inlet flange 9 of the mass spectrometer 6. However, pragmatic considerations such as line-of-sight for laser desorption and imaging drove the development of extended capillary delivery systems such as shown in FIG. 1, in which more space is obtained permitting flexibility in sampling and the sampling from multiple sample plates into one mass spectrometer unit.

To increase ion collection efficiencies in the above shown configurations, electric field extraction techniques were developed. An applied electric field serves to draw ions produced from the sample toward the capillary 8 or the sampling orifice 9*b* of the mass spectrometer 6. A further enhancement to the electric field extraction techniques has been the application of a pulsed dynamic focusing (PDF) technique which removes the electric field in the sample-to-inlet region, just prior to ions entering the capillary 8 or the sampling orifice 9*b*. The PDF technique reduces ion losses due to collisions of ions with walls of the capillary 8 or the sampling orifice 9*b*. This PDF technique as described in U.S. patent application Ser. No. 10/367,917, the entire contents of which are incorporated herein by reference, is often referred to as "timed-extraction" and has also been recently described by Tan et al. in 2004, Anal. Chem., the entire contents of which are incorporated herein by reference.

In brief, the PDF technique permits the use of off-axis ion production techniques from the sampling interface 8, such as for example off-axis laser irradiation, to generate ions from regions not directly in front of the capillary 8 or the inlet flange 9. The PDF technique increases analytical throughput when laser spot sizes are increased. Improvements in throughput with PDF have been demonstrated using AP-MALDI ion trap MS systems with both capillary and conical sampling interfaces. In addition to the higher throughput afforded by the PDF technology, sensitivity was found to be positively correlated with electric field strength.

Ion trajectories and kinetics have been recently modeled for the conventional PDF techniques. Ion simulation typically apply a boundary element method on user-defined geometries, voltage settings and gas flow rates to determine electric field, gas dynamic flow, and ion trajectories. The ion trajectories can be determined based on ion mobility calculations. Such simulations made for example for the configuration shown in FIG. 1 with a tapered extended capillary 8 show that, in a static electric field, ions off-axis from the sampling interface are lost to the walls 12 and tip 14 of the sampling interface (see FIG. 4). Simulations further showed that when PDF was applied to AP-MALDI, off-axis ions are more efficiently collected, since the electric field being terminated before the ions arrive at the walls 12 and tip 14 of the sampling interface does not force the ions onto the walls. Rather, upon termination of the electric field, the ions are entrained in the gas flow entering the mass spectrometer 6.

Further simulations to include ion recombination kinetics to study the relative ion yield associated with different configurations and electric field strengths have determined that the electric field strength directly affects ion signal intensity (see FIG. 5). One possible theory to explain this phenomenon is that positive and negative ions ejected from the sample surface by the laser pulse initially occupy a narrow layer near the target plate. The applied electric field causes these positive and negative ions to move in opposite directions, minimizing ion losses that can result from gas-phase ion recombination and neutralization. From this theory higher electric fields at the site of ionization would improve ionization efficiency and hence sensitivity, as the positive and negative ions are more rapidly separated thus reducing the number of gas-phase ion recombination events.

One potential drawback with the sampling interface designs discussed above is that the electric field may not be optimized at the location of irradiation (i.e. the location of ion generation). Thus, a significant fraction of the ions can recombine or be neutralized. While applying higher voltages to the sample target plate could raise the electric field, arcing and discharge at the higher voltages can limit the upper bound to which the electric field can be adjusted. Furthermore, the electric field in the sampling interface designs may be limited to a range of effectiveness about the sampling interface.

SUMMARY OF THE INVENTION

One object of the present invention is to provide a mechanism for generating higher electric field strength at and/or near the ionization location.

A further object of the present invention is to increase the electric field strength about areas around the sampling orifice to facilitate ion collection from large ionization areas and improve off-axis ionization.

Still a further object of the present invention is to increase the ionization efficiency of a MALDI ion source as well as an atmospheric pressure matrix-assisted laser desorption/ionization (AP-MALDI) source.

Accordingly, a further object of the present invention is to create near the sample surface a greater extraction electric field.

Various of these and other objects are provided in one embodiment of the present invention by a method for collecting ions in which ions are produced from a sample in an ion source, an electric field is provided that is more uniform in an area adjacent the sample than in an area adjacent an inlet to the ion transfer device or that is larger in field strength at the sample than at a point removed from the sample towards the inlet of the ion transfer device. In this embodiment, ions are received into the electric field and transferred through the ion transfer device to a sampling orifice of the mass spectrometer.

Various of these and other objects are provided in one embodiment of the present invention by a novel apparatus. The apparatus includes an ion transfer device configured to connect to a sampling orifice of a mass spectrometer. The ion transfer device has an inlet configured to accept ions, and the inlet has a surface that extends in a direction from an axis of the ion transfer device. In this embodiment, the ion transfer device extends a distance of at least 10 times an inner diameter of the sampling orifice of the mass spectrometer.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein:

FIG. 11 is a table of comparison of ion signal intensities of one capillary of the present invention versus a tapered capillary;

FIG. 12 is a table of comparison of ion signal intensities (base peak) per irradiated area with PDF ON (on QTOF);

FIG. 14 is a table of standard deviations in ion signal intensity measurements as a function of laser irradiation spot size (at constant fluence of 200 μJ/mm$^2$) with PDF on—(on QTOF);

DETAILED DESCRIPTION OF THE PREFERRED EMBODIMENTS

Figure 1:
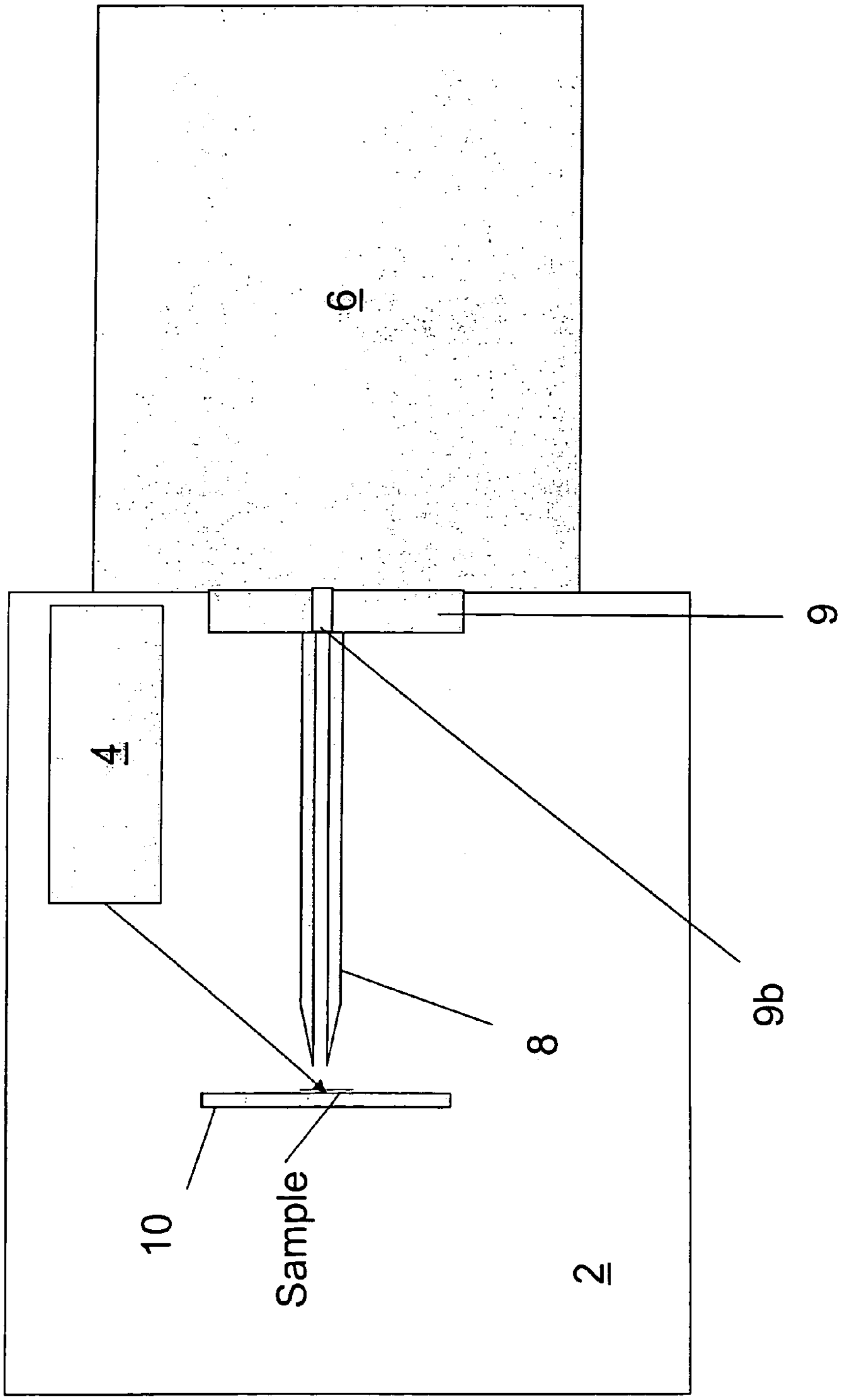
FIG. 1 Background Art
FIG. 1 is a diagram depicting an AP-MALDI source and its sampling interface configuration.
Figure 2A:
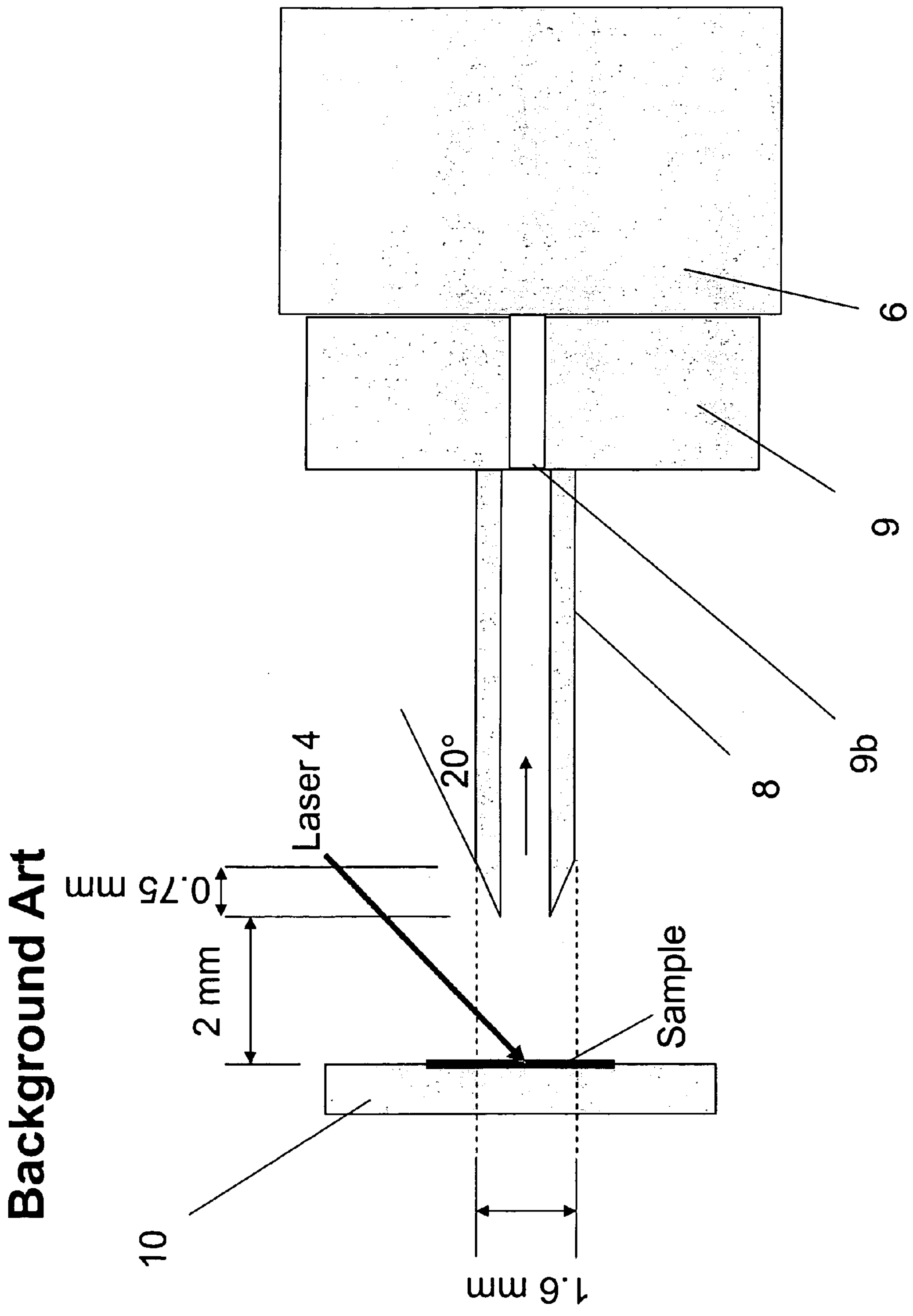
FIG. 2A is a diagram depicting an enlarged view of the AP-MALDI sampling interface configuration having an extended tapered capillary.
Figure 2B:
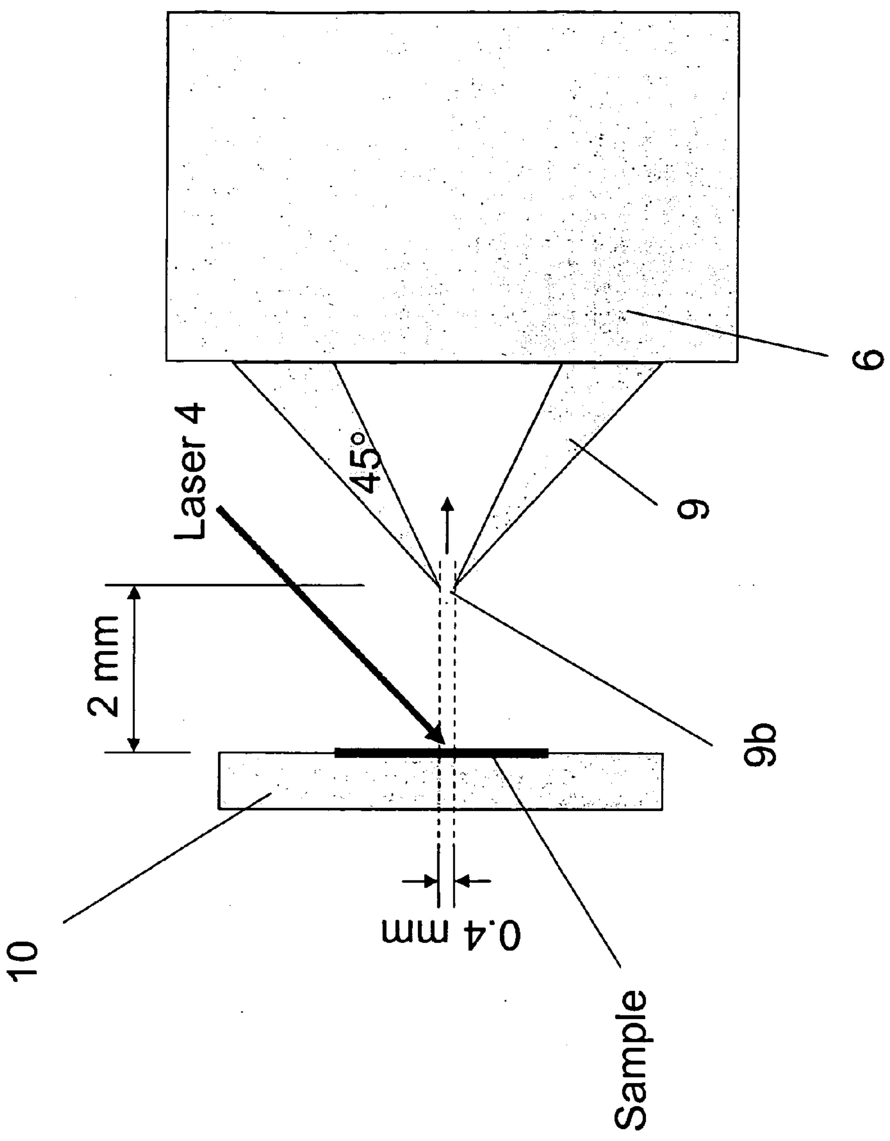
FIG. 2B Background Art
FIG. 2B is a diagram depicting another example of an AP-MALDI sampling interface configuration having a conical inlet with no extended capillary.
Figure 2C:
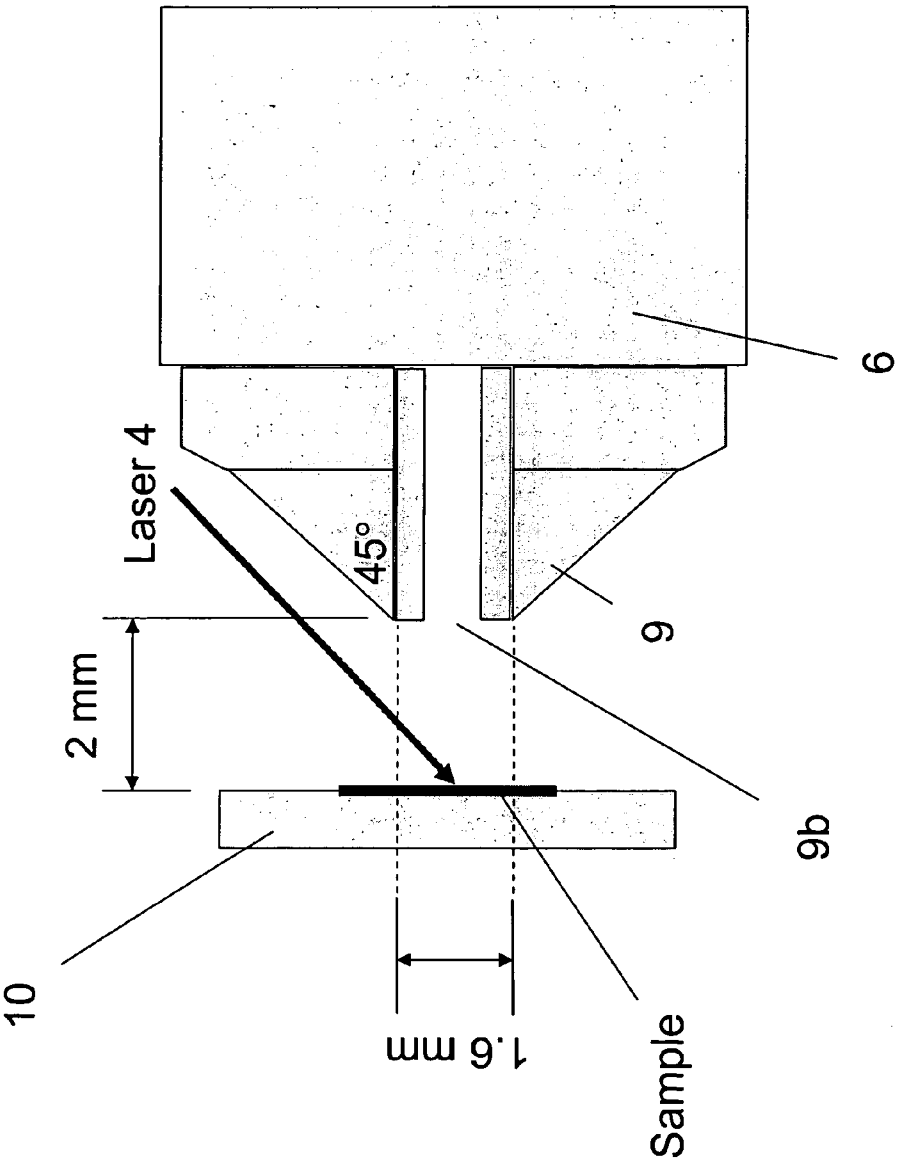
FIG. 2C Background Art
FIG. 2C is a diagram depicting another example of an AP-MALDI sampling interface configuration showing a thin-walled capillary inlet with a conical exterior with no extended capillary.
Figure 3:
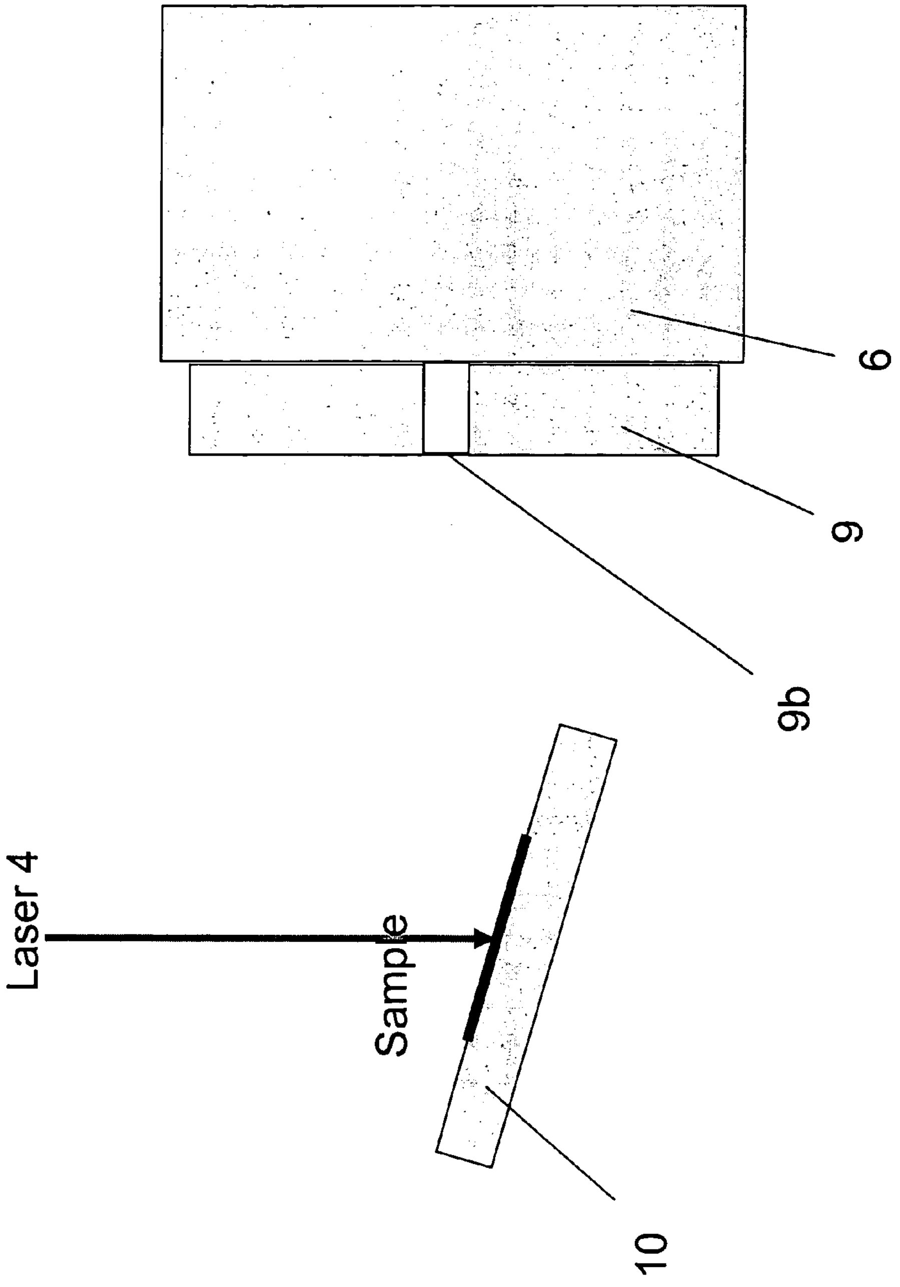
FIG. 3 Background Art
FIG. 3 is a diagram depicting another example of an AP-MALDI sampling interface configuration showing a non-parallel sample plate adjacent to thick-walled capillary inlet with no extended capillary.
Figure 4:
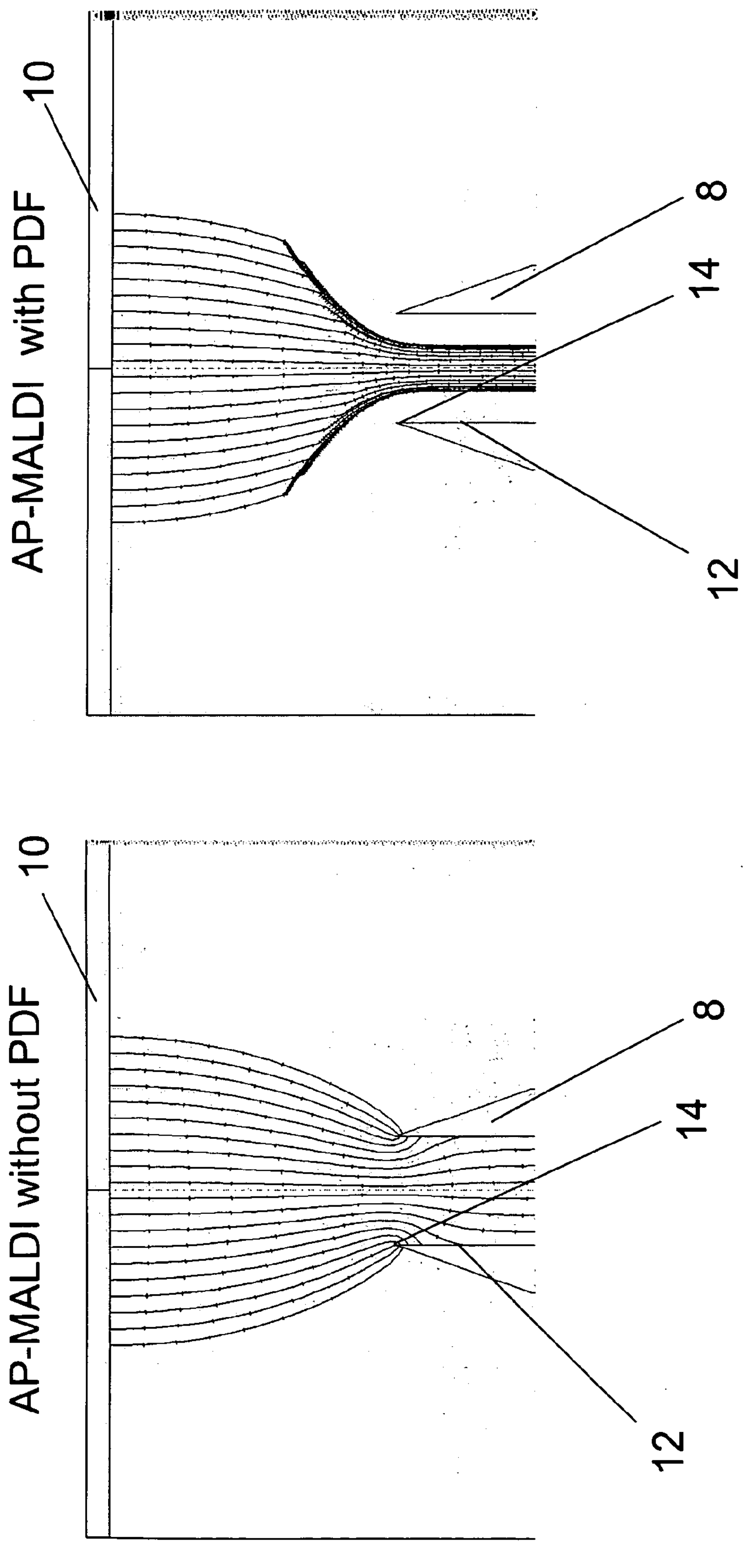
FIG. 4 is a comparison plot of the ion trajectory lines between AP-MALDI with PDF technology and AP-MALDI with a static electric field.
Figure 5:
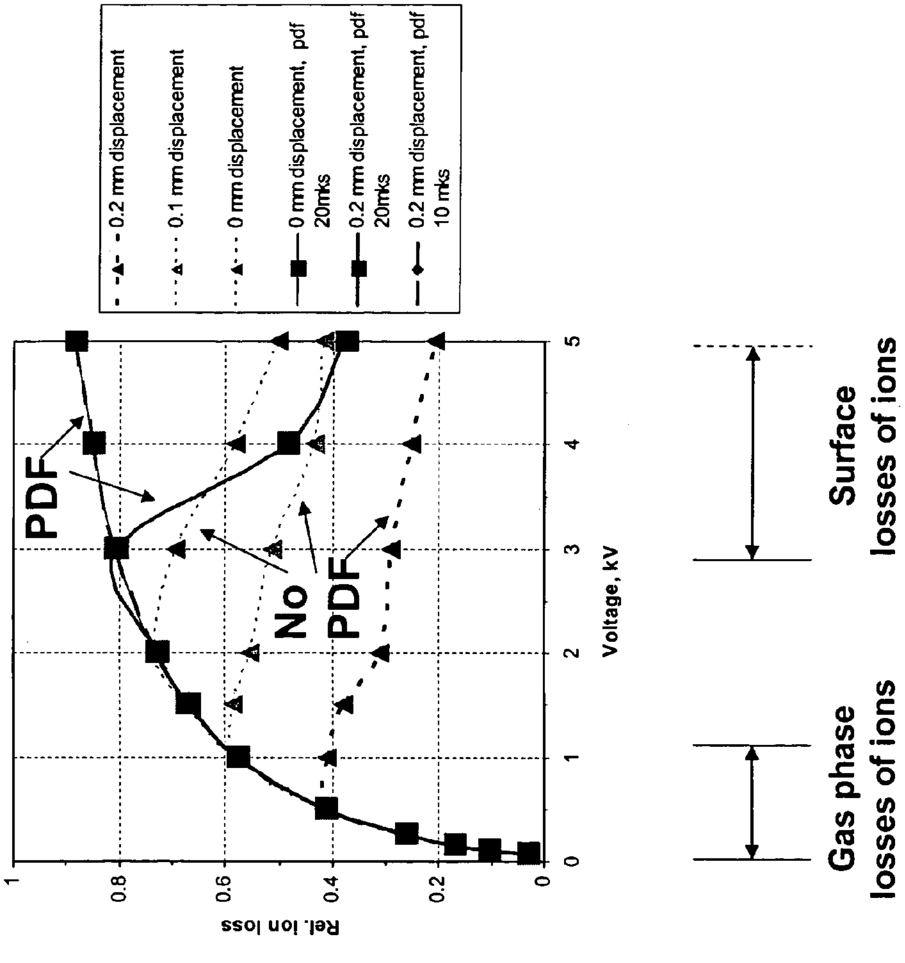
FIG. 5 is graph of the computer simulation results of using AP-MALDI with and without PDF as a function of the applied voltage.
Figure 6:
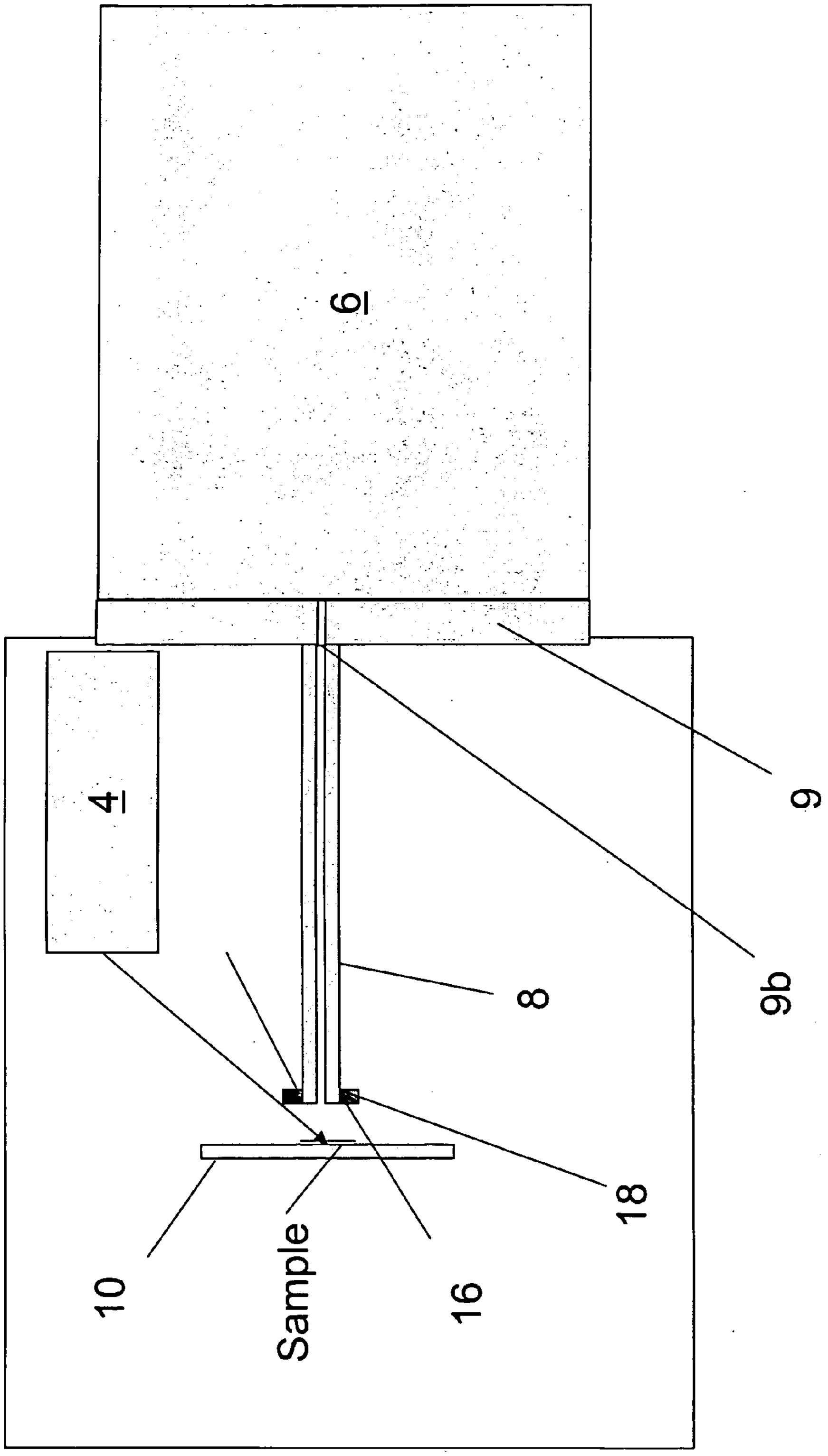
FIG. 6 is a diagram depicting one embodiment of an ion collection device of the present invention.

Referring now to the drawings, wherein like reference numerals designate identical, or corresponding parts throughout the several views, and more particularly to FIG. 6, FIG. 6 depicts one embodiment of the present invention as applied to an AP-MALDI ion source. Instead of a tapered capillary as shown in FIG. 1, FIG. 6 depicts an ion collection device in one embodiment of the present invention including an ion transfer device (e.g., extended capillary 8) and an end member (e.g., disk 18), in which the end member forms a sampling surface 16 extending parallel to the sample target plate 10. As shown, in this embodiment, the ion transfer device extends a distance from the mass spectrometer inlet flange 9. The extension distance is preferably a distance of at least 10 times an inner diameter of a sampling orifice 9*b* of the mass spectrometer 6. Details of extended capillary lengths suitable for various embodiment of the present invention are described in the above noted U.S. Serial application Ser. No. 09/795,108 entitled "Capillary ion delivery device and method for mass spectroscopy," filed on Mar. 1, 2001, the entire contents of which has been incorporated herein by reference. In the embodiment of the present invention shown in FIG. 6, a disc 18 (e.g., provided by a 4 mm O.D. "washer" attachment) forms an area preferably parallel to the sample target plate to create a more uniform electric field over a larger area than would be present from a tapered capillary. A magnified view of the ion collection device is shown in FIG. 7A.

Figure 7A:
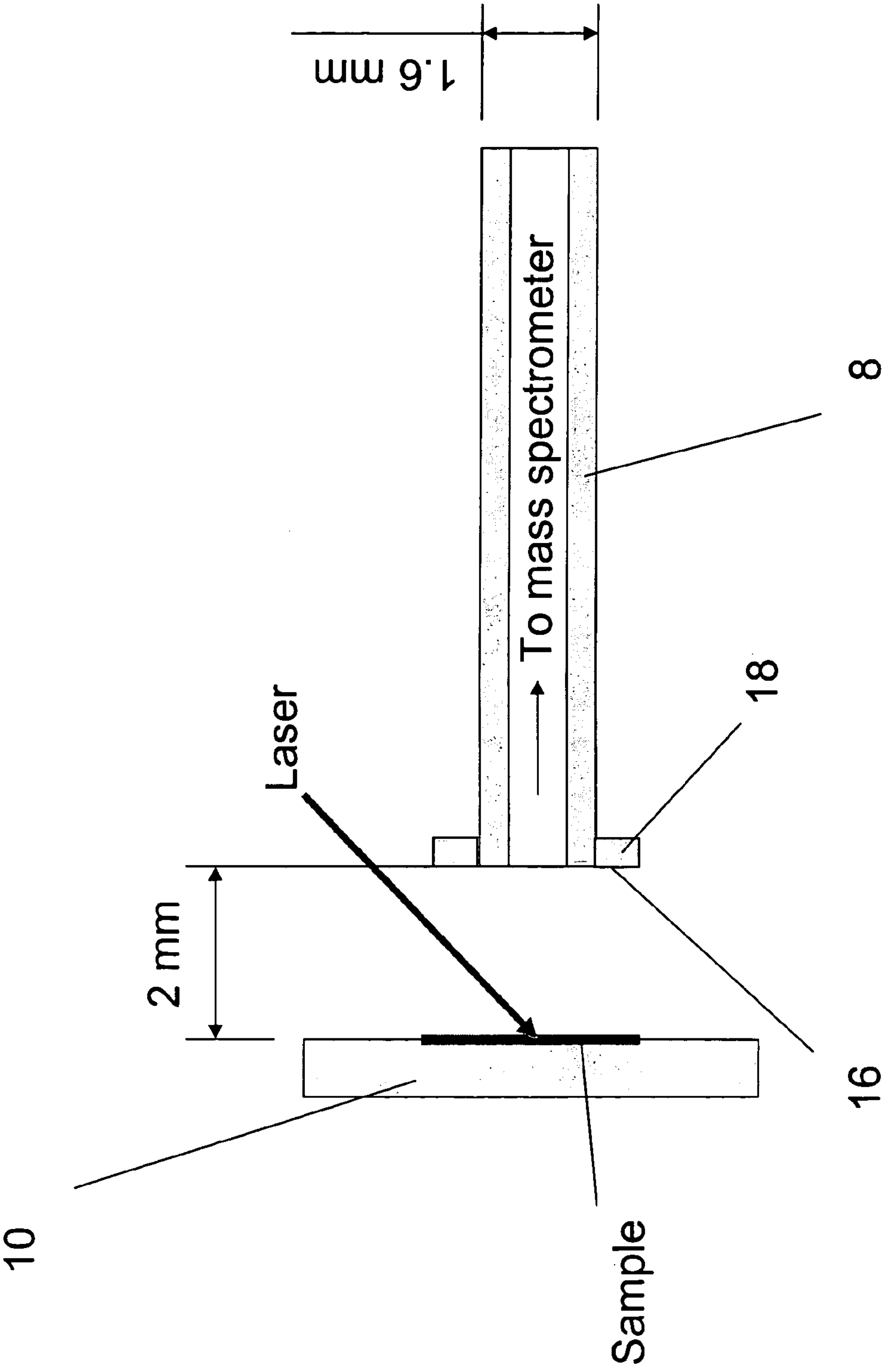
FIG. 7A is an enlarged view of the ion collection device of the present invention having a disk attached to the capillary.
Figure 7B:
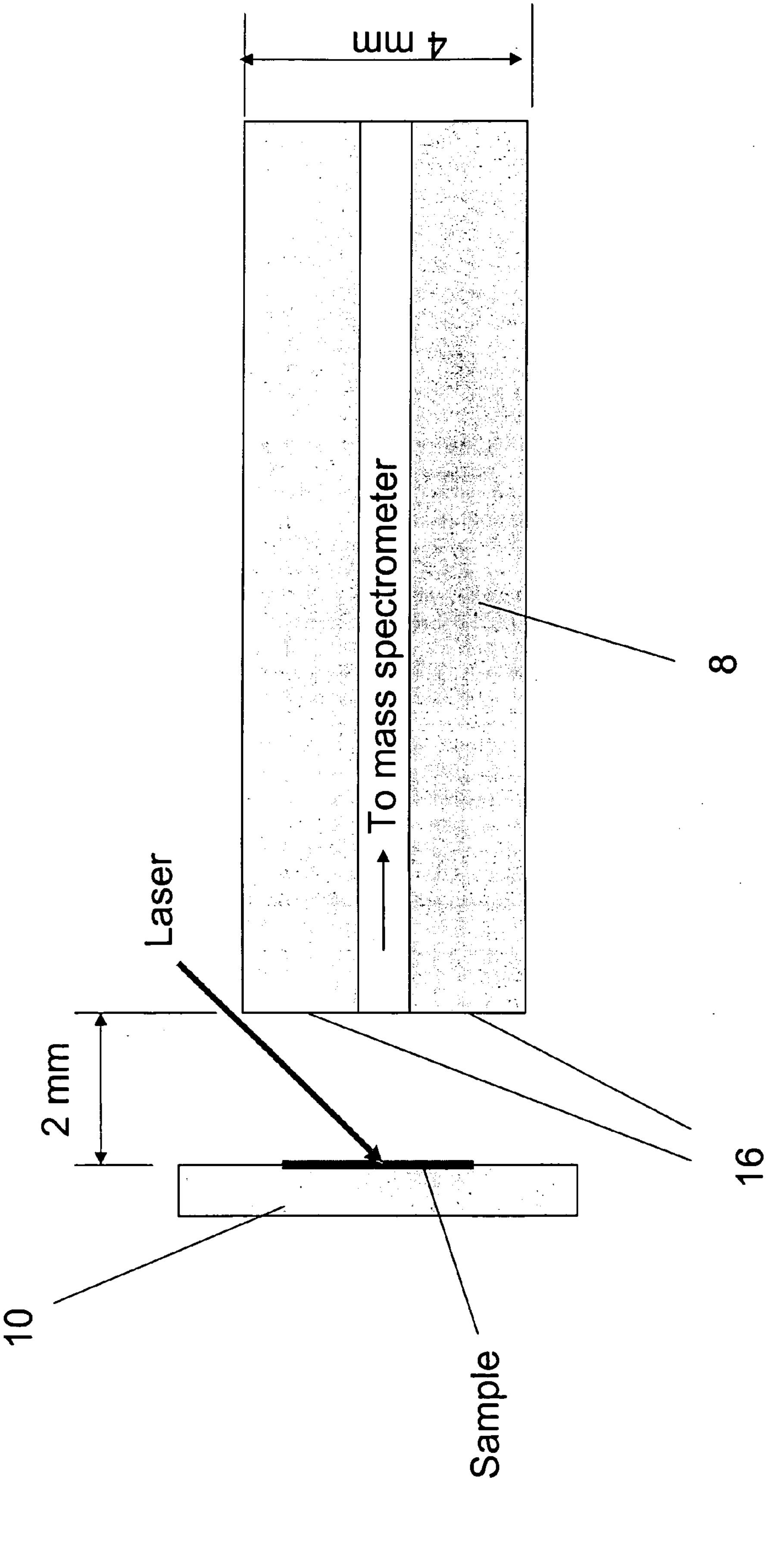
FIG. 7B is a diagram depicting another embodiment of the present invention showing an extended outside-diameter capillary serving as a collection device of the present invention.
Figure 7C:
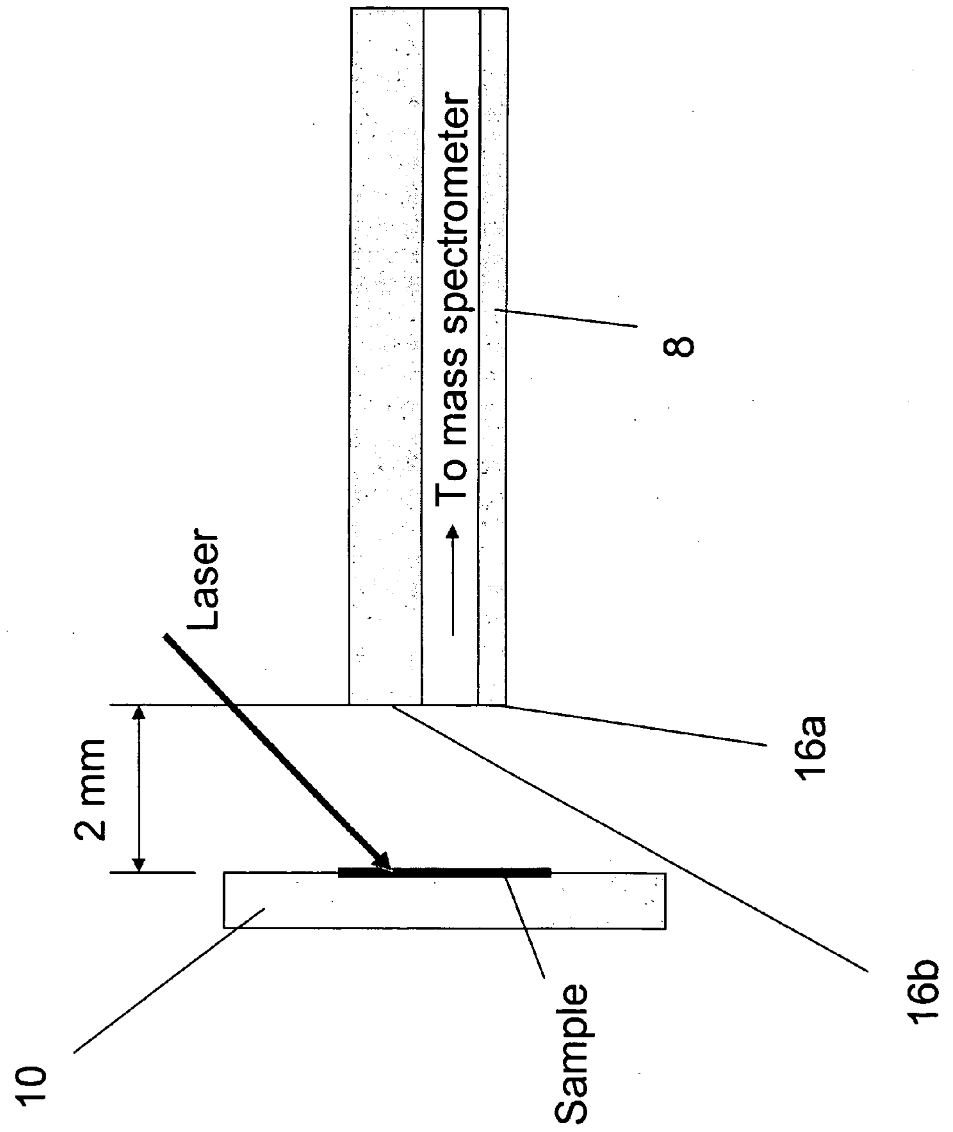
FIG. 7C is a diagram depicting another embodiment of the present invention showing a non-concentric capillary serving as a collection device of the present invention.

Other embodiments of the present invention utilizing an extended capillary 8 as an ion collection device are shown in FIGS. 7B–7C. Each of these embodiments provide more uniform electric fields over larger areas. The extended capillary 8, as to be discussed later, provides flexibility in sampling ions generated from the sample.

Figure 8:
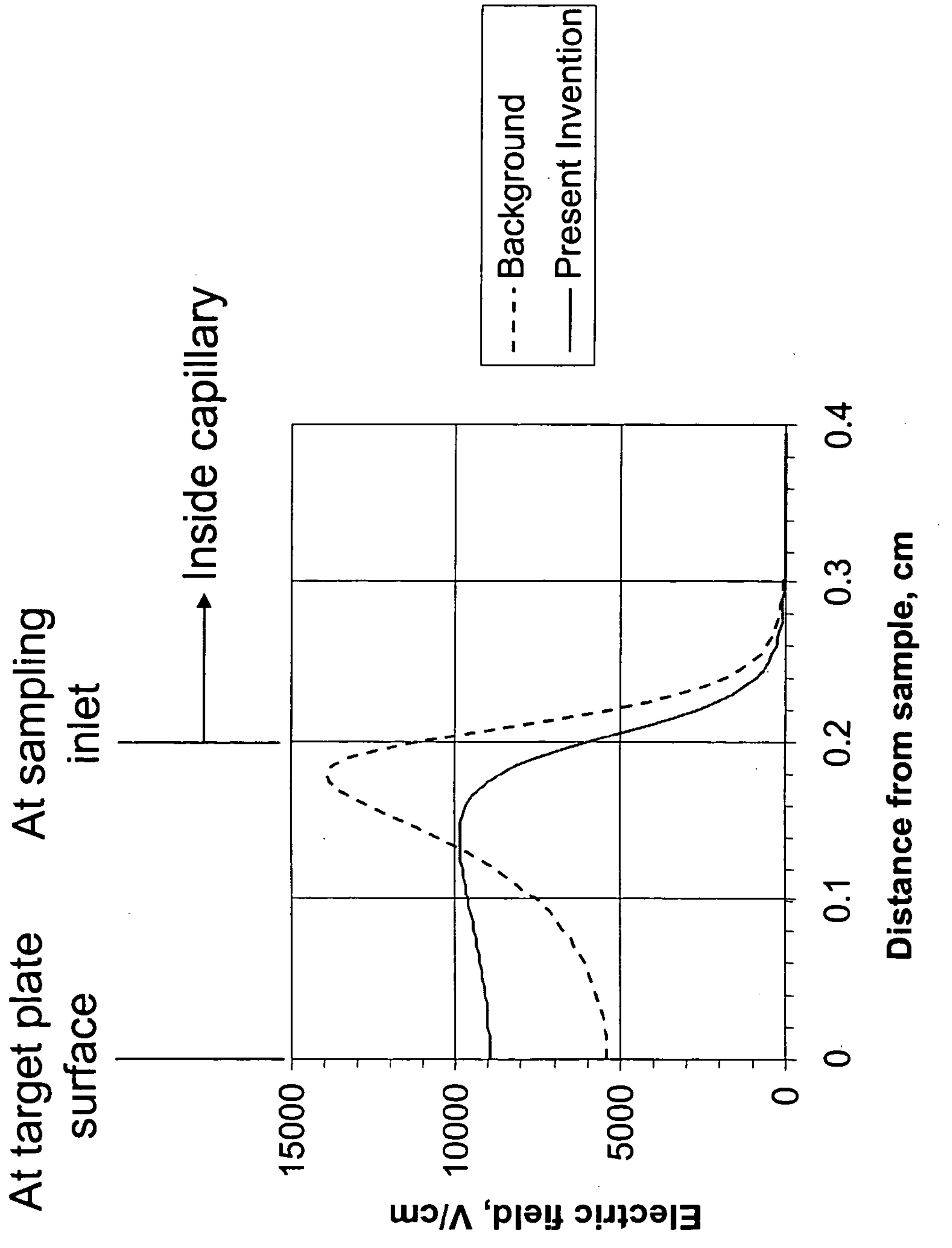
FIG. 8 is a diagram depicting the electric field strength as a function of the distance from the sample, comparing embodiments of the present invention to other techniques.

The present inventors have employed models to simulate the electric field in the present invention, and have compared the resultant electric field with the electric field present around tapered capillaries. (see FIG. 8). The present invention at the same voltage effectively applies a higher electric field at the sample surface in comparison to when a tapered capillary is used. As shown in FIG. 8, for a background device, the field strength in an area adjacent the sample is ~5,050 V/cm as compared to a peak field strength of ~14,000 V/cm. In one example of the present invention, the field strength in an area adjacent the sample is 9,000 V/cm as compared to a peak field strength of ~9,900 V/cm. Thus, in the present invention as shown in FIG. 8, the field strength in an area adjacent the sample is at least 50% of the peak field strength between the sample and the inlet.

Referring to FIGS. 7A–7C, in these embodiments of the present invention, a sampling surface 16 is provided at the end of the capillary 8 opposite the mass spectrometer 6 or opposite the mass spectrometer inlet flange 9 (e.g., opposite the sampling orifice 9*b*). In one embodiment of the present invention, the sampling surface 16 is preferably a surface planar to the sample plate 10. The dimensions shown on FIGS. 7A–7D are used as illustrative dimensions. As shown in FIG. 7B, the ion collection device of the present invention can, in one embodiment, be an extended capillary 8 having a thick end wall (in a range of at least three times a diameter of the capillary opening). The thick end wall serves as the end member 16. As shown in FIG. 7C, the ion collection device of the present invention can, in one embodiment, be an extended capillary 8 having a non-concentric capillary opening or gas passage. In this embodiment, the area of the end wall serves as the end member 16. In this embodiment, the thickness of the wall 16*b* is in a range of 2–5 times a diameter of the capillary opening.

Figure 7D:
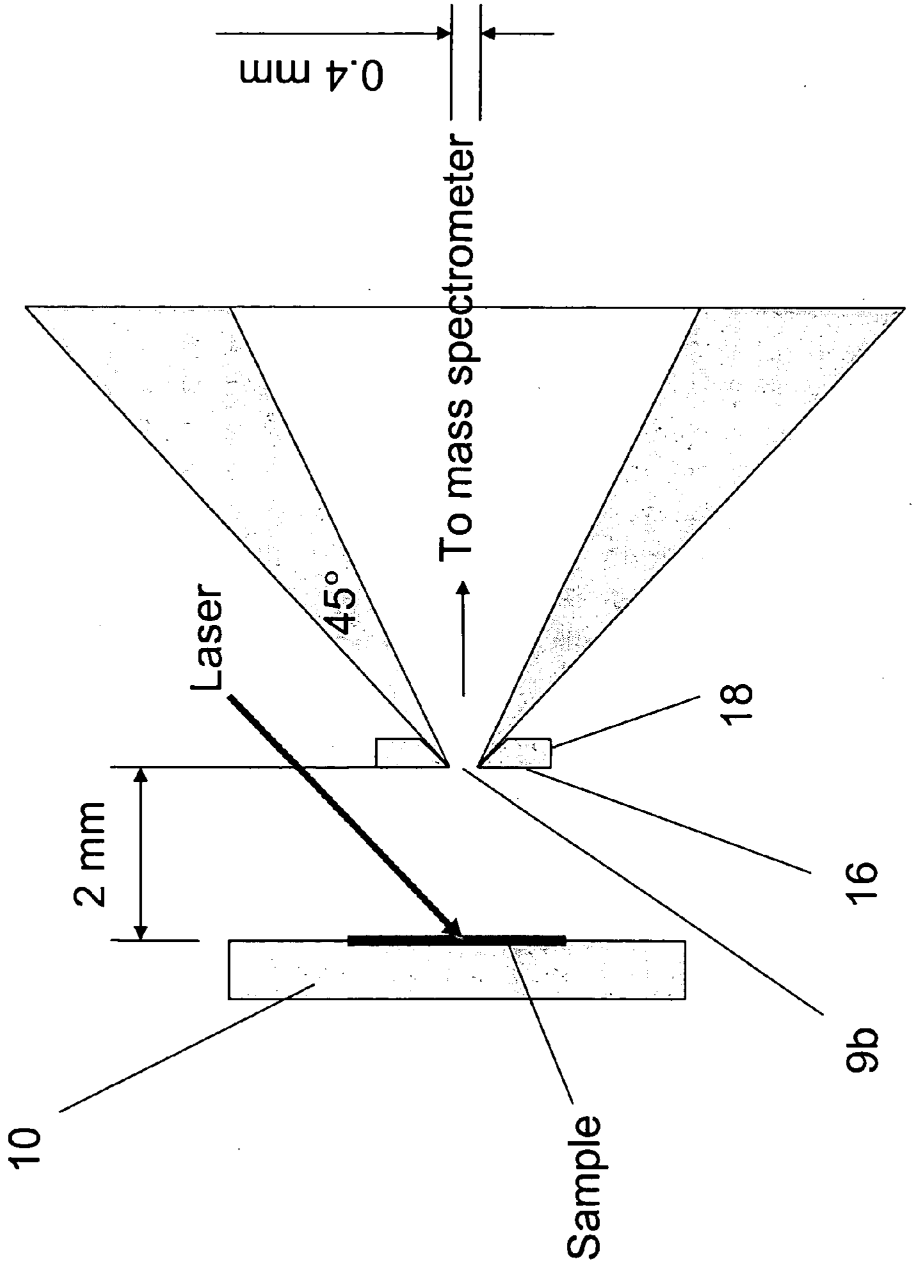
FIG. 7D is a diagram depicting another embodiment of the present invention showing a disk attached to a conical sampling interface serving as a collection device of the present invention.

FIG. 7D represents another embodiment of the present invention. In this embodiment, an extended capillary 8 is not used. Rather to provide the sampling surface 16, a disk 18 is attached to the mass spectrometer inlet flange 9. Attachment of the disk 18 to the inlet flange 9 (or to the capillary 8 in other embodiments of the present invention) can occur by welding, solder, adhesive, or mechanical attachment. In FIG. 7D, the disk 18 serves to provide the sampling surface 16 which, as previously noted, preferably is parallel to the sample plate 10.

The disk 18 in FIG. 7D, similar to that illustrated specifically in FIG. 8, causes the applied electric field to be more uniform in an area adjacent the sample than in a an area adjacent the sampling orifice 9*b* of the mass spectrometer.

Figure 9A:
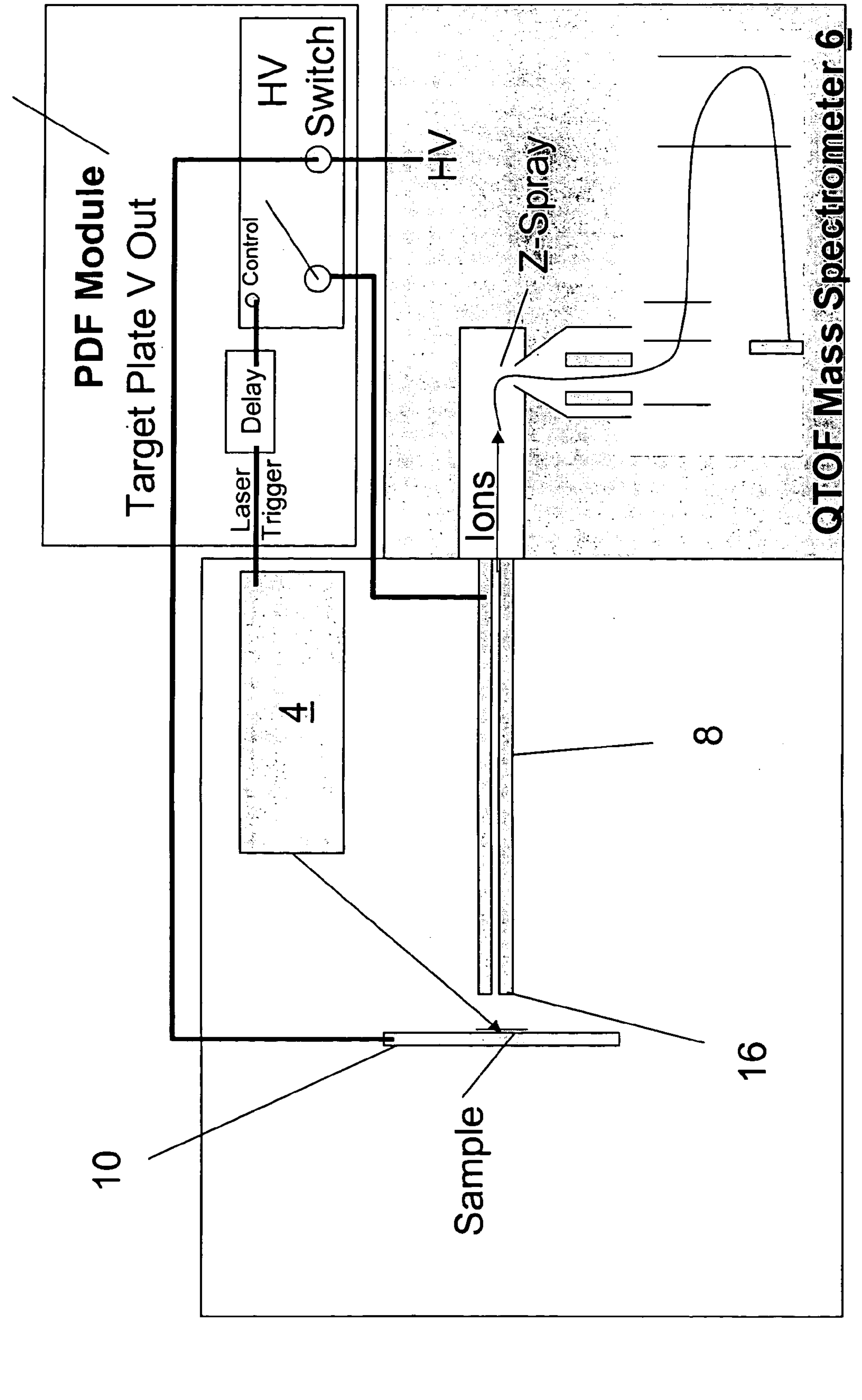
FIG. 9A is a schematic diagram of a sampling interface connected to a QTOF mass spectrometer.

Various embodiments of the present invention have been demonstrated on a Quadrupole Time-of-Flight (QTOF) mass spectrometer (QTOF-II; Waters/Micromass) with a Z-Spray interface and an AP/MALDI source (Model 411, MassTech, Inc.) with PDF (MassTech, Inc.). The sampling cone in the standard Z-Spray interface was replaced with a capillary 8, and the inlet end of the capillary was modified with the different inlet geometries such as shown in FIGS. 6–7C. The PDF module 20 (as shown for example in FIG. 9A) employed in these exemplary demonstrations was a MassTech Inc., Model 1×2 modified for the QTOF-MS system to accommodate a 173 V applied voltage. The PDF module 20 switched the applied HV electric field to zero, 10 μs after the laser irradiation pulse.

Samples used in the demonstrations were prepared on AP/MALDI target plates using a mixture of 4 peptides (Angiotensin I, II, Bradykinin, Fibrinopeptide A) at a 1 pmol level with an alpha-cyanno-4-hydroxycinnamic acid (CHCA) matrix. Each sample was spotted with 1 μL of peptide-matrix solution (peptides were made to a concentration of 1 pmol/μL each) and operated with AP/MALDI's spiral motion option. The laser spot size used was varied between 0.25 to 1.1 $mm^2$. The laser energy per pulse was varied from 50 to 200 μJ/pulse.

Figure 9B:
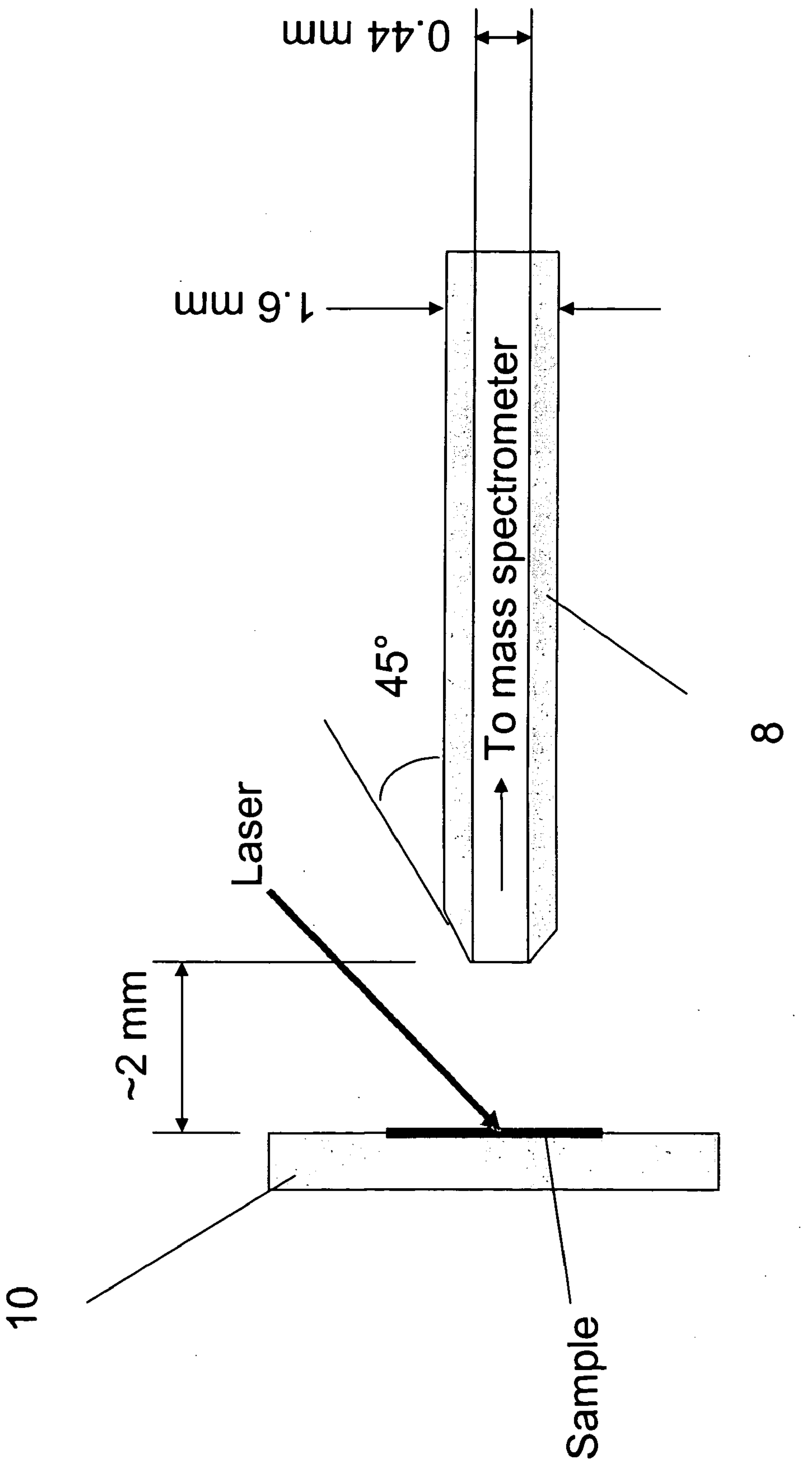
FIG. 9B is a close-up depiction of an AP-MALDI sampling interface configuration with a tapered capillary used in the experimental results on the QTOF.
Figure 9C:
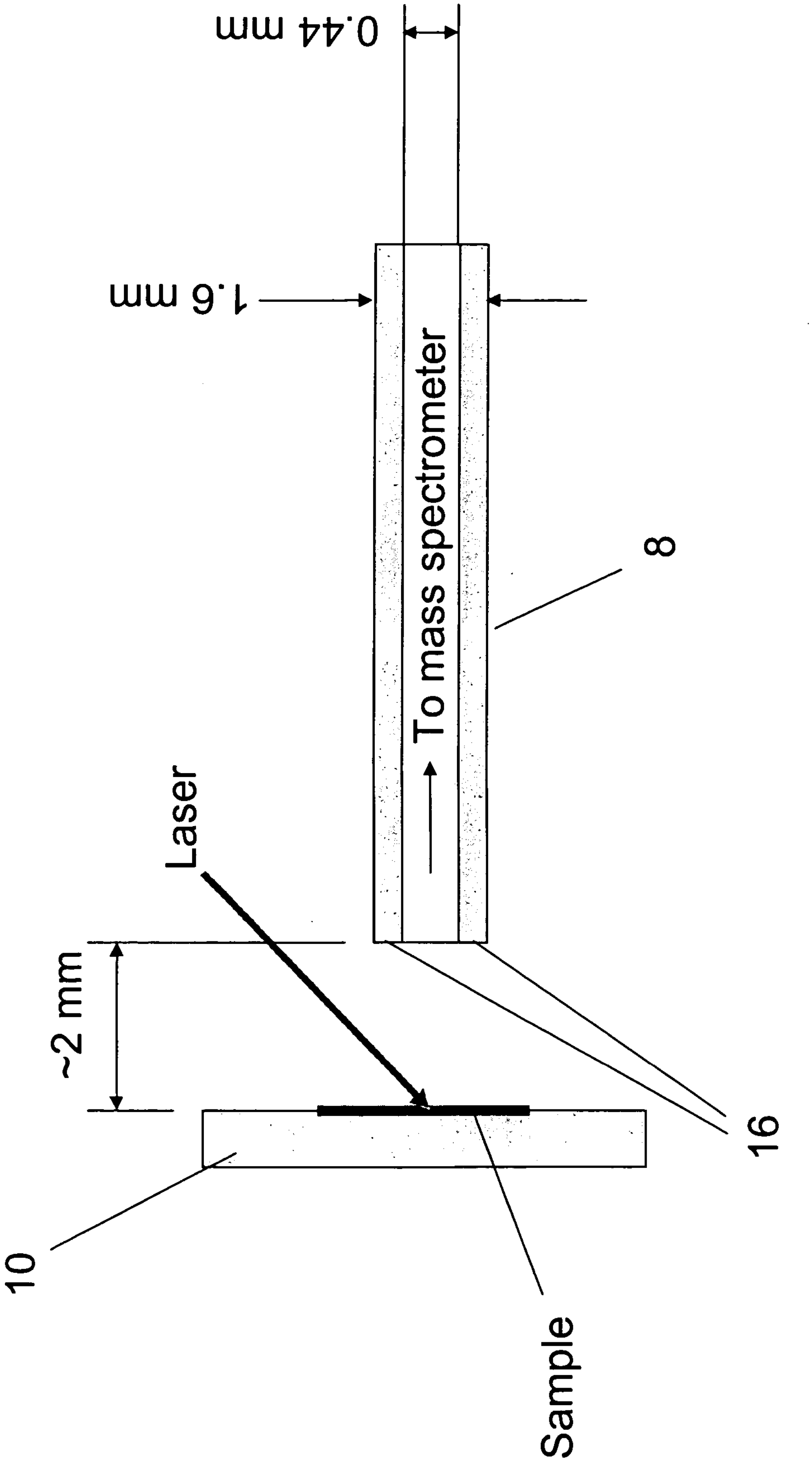
FIG. 9C is a close-up depiction of the specific AP-MALDI sampling interface configuration of one embodiment of the present invention used in the experimental results on the QTOF.

FIG. 9B shows a tapered capillary configuration. The taper angle of 45° is less sharp than in other designs where typically a 20° angle is applied. FIG. 9C shows the capillary configuration utilized for the comparative work here. Comparisons between these two configurations demonstrate the improvements provided by one embodiment of the present invention. Further improvements would be expected for comparisons between the embodiment shown in FIG. 9C and tapered capillary designs having even sharper capillary designs (e.g., 20° vs. 45°) than the configuration in FIG. 9B. Moreover, further improvements beyond the configuration in FIG. 9C are expected when, as in FIG. 7A, the area of the sampling surface 16 is increased.

Figure 10:
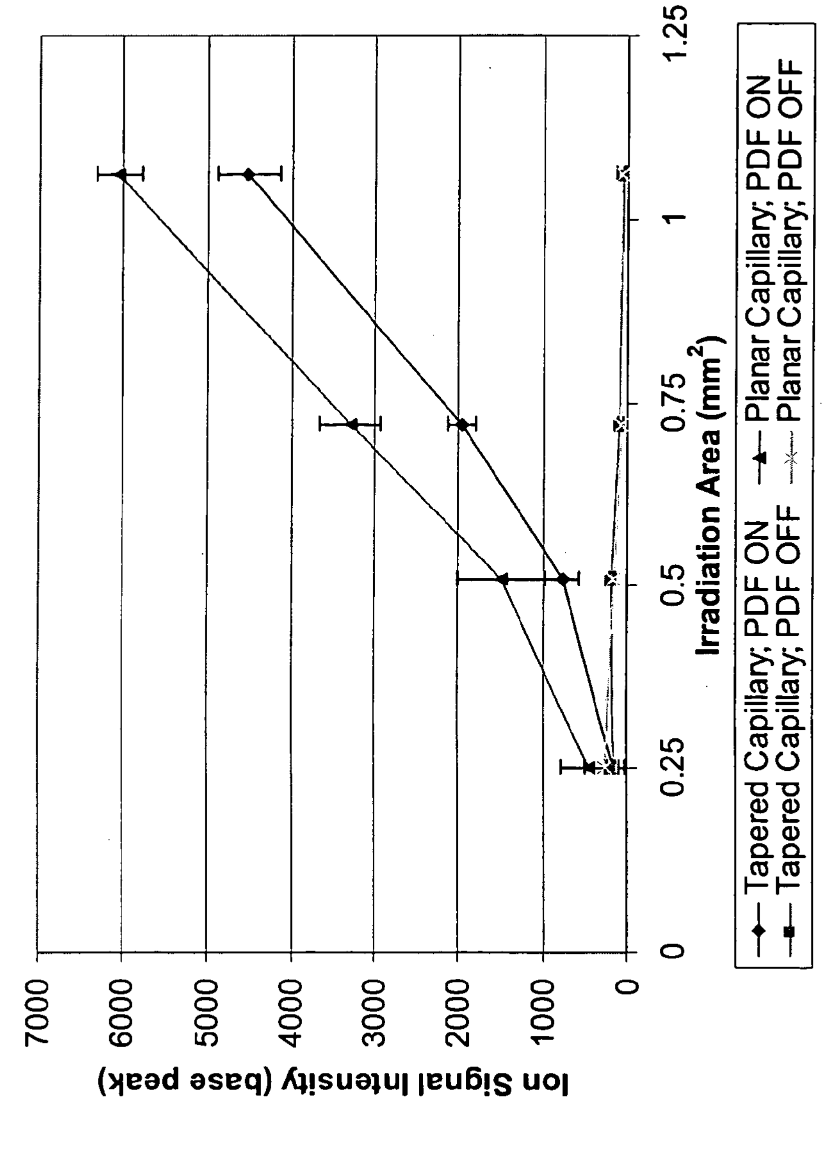
FIG. 10 is a graphical presentation of ion signal intensity versus laser spot area at a constant fluence of 200 μJ/mm$^2$ for tapered vs. a planar capillary configuration according to one embodiment of the present invention.

Comparison of the results between the sampling interface configurations shown in FIGS. 9B and 9C, as applied to AP-MALDI PDF on a QTOF mass spectrometer, are summarized in FIG. 10. Ion signal intensities obtained in FIG. 10 (and in FIGS. 11–16) were for the base peak (1538 Da—Fibrinopeptide A) acquired after summation of the signal over 1 minute. These results are representative and not limiting of the present invention. The results in FIG. 10 were obtained at a constant laser fluence of 200 μJ/$mm^2$ over different irradiation areas to investigate sensitivity and throughput improvements. The results show that with PDF applied, the capillary design of the present invention shown in FIG. 9C, with no taper, yielded statistically better ion signal intensity than the configuration in FIG. 9B, using a tapered capillary. A higher signal intensity, as can be seen in FIG. 10, was present for all irradiation areas tested. When PDF was not applied, the results were not statistically different. The absence of an improvement without PDF can be explained by the fact that higher electric fields, although enhancing ionization efficiency, force the extracted ions into the surface of the sampling inlet where these ions are lost.

The improvement factor of the planar capillary design over the tapered capillary configuration with PDF applied is quantified (for exemplary purposes) in FIG. 11. At a 0.25 $mm^2$ laser irradiation area, an improvement of 2.7 times can be seen. As the laser spot gets larger, the improvement is still present but declined, possibly due to the limited area over which the higher electric field strength is applied. Thus, a 2.7 times enhancement or greater in sensitivity is possible in one embodiment of the present invention.

Figure 13:
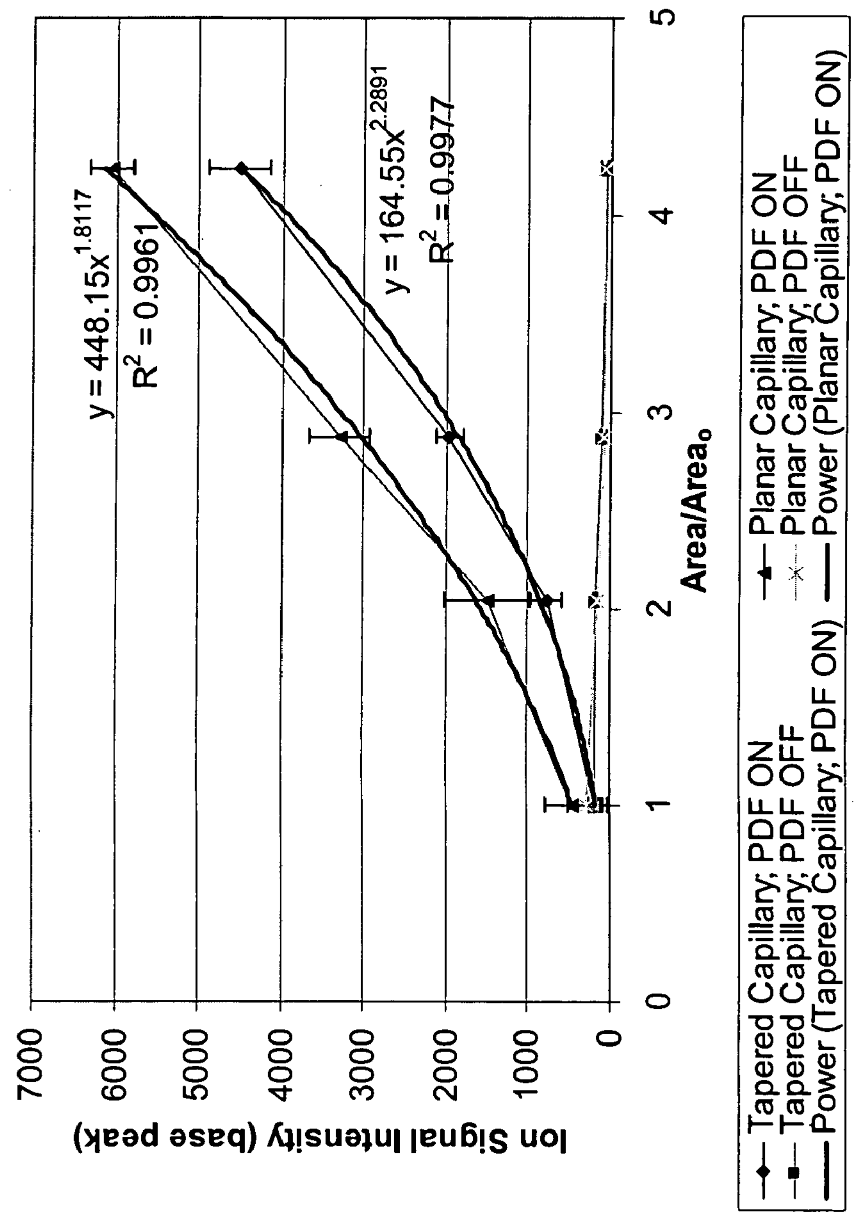
FIG. 13 is a graphical presentation of ion signal intensity versus factor of increase in laser spot area (at a constant fluence of 200 μJ/mm$^2$) for tapered versus the planar capillary configuration of an embodiment of the present invention.

In terms of throughput differences between conventional and the ion collection devices of the present invention, with PDF on, FIG. 12 shows that ion signal intensity per irradiated area is not constant, but rather increases with increasing area. This is in contrast to results found with AP-MALDI PDF applied to a Thermo Finnigan LCQ ion-trap and described by Tan et al., Anal. Chem., in press, where a linear dependence of spot size (at constant laser fluence) with total ion current was found. By curve fitting a power law dependence to the data, FIG. 13 shows that the following approximate dependence of ion signal intensity with area ratio: $I=I_0(A/A_0)^2$. This result is consistent with effects known for a Z-spray interface associated with the Micromass/Waters QTOF mass spectrometer, where greater ion currents result in disproportionately higher sensitivity. Moreover, the result suggests that significant improvement factors are attainable with larger irradiation areas in the particular case of AP-MALDI PDF with the QTOF MS configuration. In one embodiment of the present invention, laser spot sizes as large as 2 mm diameter can be effectively applied (i.e., having area of 3.14 $mm^2$). Spot sizes greater than 2 mm in diameter are also suitable for the present invention.

As for throughput differences between the tapered design and the various ion collection devices of the present invention, for sharper inlets, throughput is expected to level off at larger laser spot sizes. However, at the irradiation chosen and for the spot sizes evaluated, both the tapered configuration and the non-tapered configurations showed significant increases in ion signal intensity with laser spot size. Further, for larger spot sizes described above, higher throughput capacity and better off-axis ionization are expected.

Accordingly, an advantage of the present invention is that it permits larger spot sizes in MALDI, thereby reducing the spot-to-spot variations that arise due to sample inhomogeneity. Indeed, FIG. 14 shows the decline in the standard deviations from replicate analyses when larger irradiation areas are applied.

Figure 15:
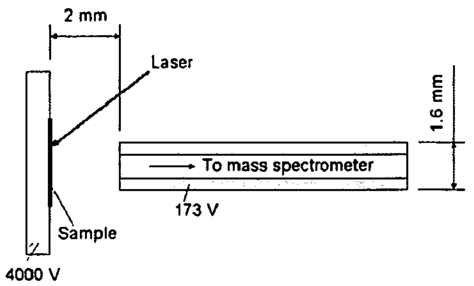
FIG. 15 is a table of ion signal intensity for sampling interface configurations employing embodiments of the present invention.
Figure 15:
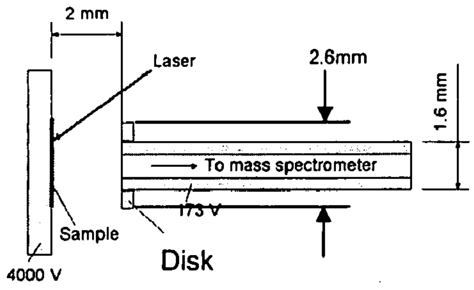

FIG. 15 shows the result of applying a disk 18 to a capillary 8. A sensitivity improvement in the base peak was realized with the application of a disk 18 in comparison to a capillary 8 without a disk 18. The results in FIG. 15 indicate a general improvement with the present invention, i.e. producing ion signal intensity levels that were previously unattainable using tapered capillaries.

Various embodiments of the present invention have also been demonstrated on an quadrupole ion trap mass spectrometer (ITMS) such as for example a LCQ Classic Thermo Finnigan mass spectrometer with an AP/MALDI source (Model 111, MassTech, Inc.) which includes a capillary extender. The PDF module employed in this demonstration was the commercially-available MassTech Inc. PDF Module, Model 1×2. In the ITMS experiments, the PDF module was set to pulse the HV electric field to zero 15 μs after the laser irradiation pulse. The sample preparation for the ITMS experiments were the same as previously described for the QTOF. A laser spot size of ~1.1 $mm^2$ and a laser energy of ~220 μJ/pulse were applied.

Figure 16:
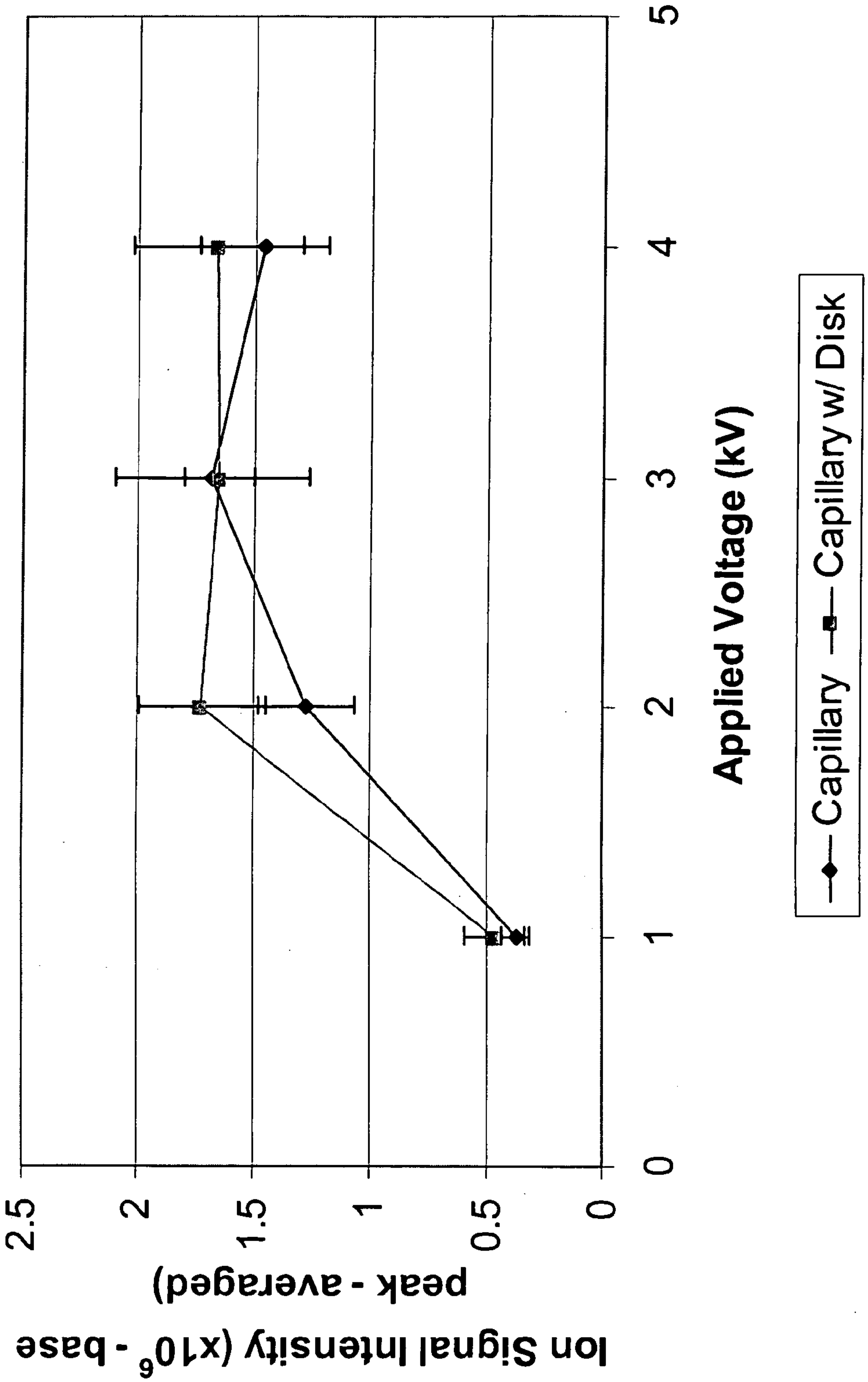
FIG. 16 is a graph comparing ion signal intensities obtained with the planar capillary configuration of one embodiment of the present invention versus a disc-capillary configuration of another embodiment of the present invention.

In the setup for the ITMS, the commercial capillary, which has a significantly larger inner diameter of 0.75 mm (vs. 0.44 mm in results from FIGS. 10–15), was used. To increase the ion collection, a disk 18 was once again attached to the capillary 8. Comparing the capillary 8 with the disk 18 to a capillary without a disk showed that adding a disk 18 allowed improved performance at lower applied voltages (FIG. 16). Obtaining 3 kV performance (best without the disk 18) at a 2 kV setting makes the AP-MALDI PDF system safer to operate, without compromising performance.

The improvement factors at 2 kV and 4 kV settings for the disk 18 attachment were measured to be +35% and +15%, respectively. Differences in the improvement factors between the ITMS and QTOF systems at the same 4 kV setting may be attributed to differences in the capillary-to-target plate distances between the two AP-MALDI models. This would result in the systems being tested at different electric fields. Despite the differences, the benefits of the invention in both ITMS and QTOF systems have been demonstrated.

One aspect of the present invention, owing to the reduction in the peak electric field which in conventional sampling orifices occurs near the inlet to the orifice (see FIG. 8), permits application of higher voltages than allowed in prior AP-MALDI PDF configurations. Although 4 kV over a ~2 mm target plate-to-sampling inlet distance was the highest voltage setting applied in the demonstrations disclosed herein, even greater voltages can be applied, according to the present invention, without premature electric field breakdown.

Figure 17:
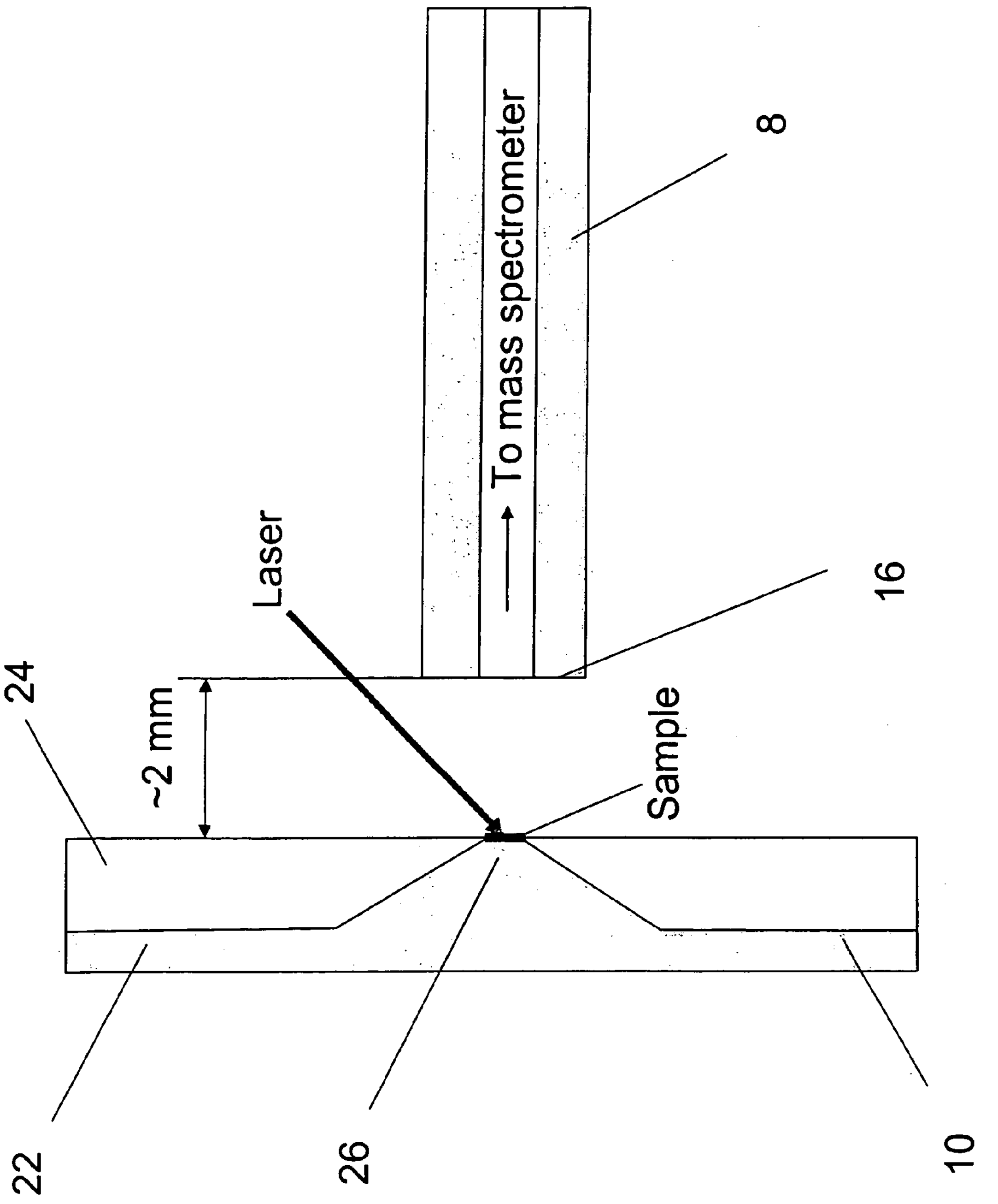
FIG. 17 is another embodiment of the present invention showing a modified sample target plate for high electric field strength near the sample surface.

In another embodiment of the present invention, the electric field near the sample surface is increased due to the presence of metallic structures (e.g. tapered metallic structures) on the surface of the sample plate 10. As shown in FIG. 17, the sample plate 10 can include a metallic backing 22 and an insulator 24. In this embodiment, tapered metallic structures 26 are formed in the metallic backing 22. Other designs of metallic protruding structures which serve to concentrate the electric filed near the sample plate 10 are likewise suitable for this embodiment of the present invention. This configuration reverses the configuration shown in FIG. 8, where instead of the electric field peaking to a maximum near the sampling inlet location, the electric field would peak to a maximum near the sample surface. In this embodiment of the present invention, the electric field strength is increased about a region in which sample ionization occurs, and thus reduces the above-described gas-phase recombination problem by having the electric field strength the highest where the negative and positive ions are created. As shown in FIG. 17, an insulator 24 can be provided over the metal protrusions to provide a surface upon which sample material can be deposited for ionization such as for example with laser desorption/ionization.

Hence, one apparatus of the present invention, as illustrated by the above embodiments, can include an ion transfer device configured to connect to a sampling orifice (or inlet flange) of a mass spectrometer. The ion transfer device has an entrance inlet configured to accept ions. The inlet has an end member whose surface extends in a direction from an axis of the ion transfer device. The ion transfer device extends in a direction from the sampling orifice of the mass spectrometer preferably a distance of at least 10 times an inner diameter of an entrance orifice of the mass spectrometer. In one preferred embodiment of the present invention, the surface is parallel to a surface of a sample plate holding a sample to be ionized. The ion transfer device can include a capillary having a gas passage, with the capillary having a wall thickness that is in a range of 2–5 times a diameter of the gas passage. The ion transfer device can include a capillary having a gas passage and a disk at an inlet of the gas passage, with the disk having a diameter that is in a range of 2–5 times a diameter of the gas passage.

In another embodiment of the present invention, the apparatus includes a sample plate configured to locate a sample to be ionized. The capillary of the ion transfer device can, in that embodiment, have a wall thickness greater than a distance between the sample plate and the entrance to the ion transfer device. Likewise, the capillary of the ion transfer device in this embodiment can include a disk at an inlet of the capillary, with the disk having an outer diameter greater than a distance between the sample plate and the entrance to the ion transfer device. The sample plate can have metallic protrusions extending in a normal direction from the sample plate and can include a dielectric covering the metallic protrusions.

In still another embodiment of the present invention, the apparatus of the present invention can include a conical ion transfer device configured to transfer ions to a mass spectrometer. The conical ion transfer device includes an inlet to accept ions, with the inlet constituting an end member whose surface extends in a direction from an axis of the ion transfer device. The surface, in one embodiment, preferably extends to a diameter greater than a distance between a sample plate locating the sample and the inlet of a conical ion transfer device. In one preferred embodiment of the present invention, the surface is parallel to a surface of a sample plate holding a sample to be ionized.

In either of the above-noted embodiments, the apparatus can include a pulse modulator configured to provide an electric field between the sample plate and the inlet of the ion transfer device. The pulse modulator can be configured to reduce a field strength of the electric field prior to the ions drifting in the electric field arriving at the inlet of the ion transfer device.

In either of the above-noted embodiments, the apparatus can include an ion generator configured to produce the ions. The ion generator can include the above-noted sample plate locating a sample to be ionized and a laser source configured to produce the ions for example by matrix-assisted laser desorption/ionization.

Figure 18:
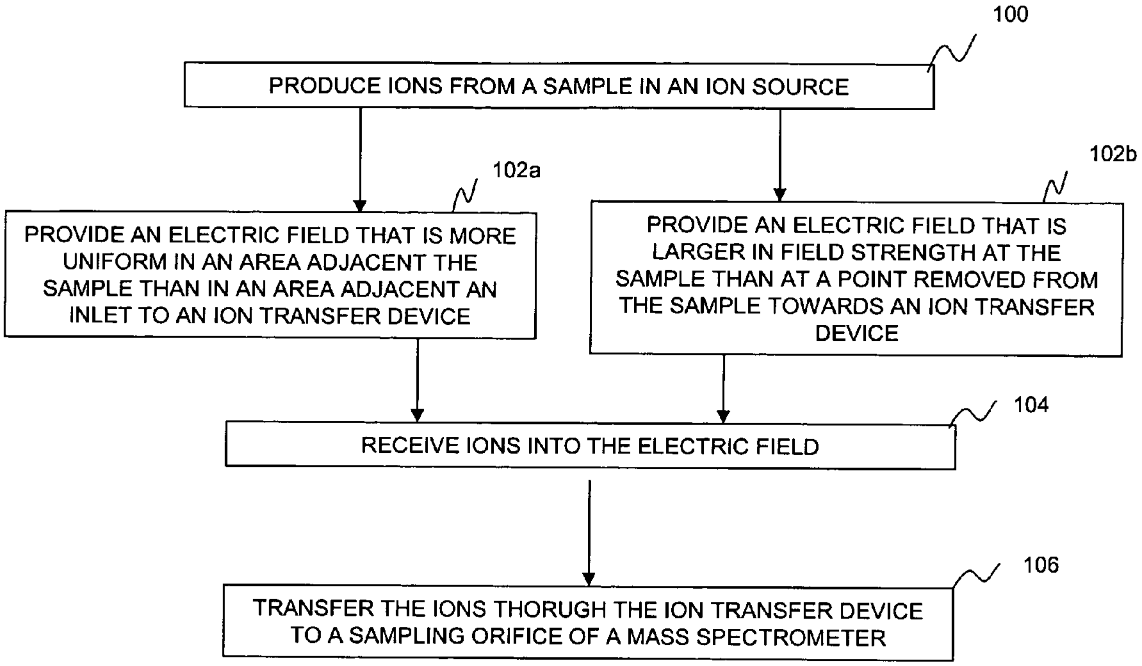
FIG. 18 is a flowchart illustrating a method according to various embodiments of the present invention.

FIG. 18 is a flowchart illustrating a method according to various embodiments of the present invention. As shown in FIG. 18, at step 100, ions are produced from a sample in an ion source. At step 102, an electric field is provided that is more uniform in an area adjacent the sample than in an area adjacent an inlet of the ion transfer device (step 102*a*) and/or that is larger in field strength at the sample than at a point removed from the sample towards an inlet of the ion transfer device (step 102*b*). At step 104, the ions are received into the electric field and transferred through the ion transfer device to a sampling orifice of the mass spectrometer.

In step 100, the ions can be produced at atmospheric pressure or at pressures above 100 mTorr. The ions can be produced by laser desorption/ionization including matrix-assisted laser desorption/ionization. In step 102, the electric field can be provided such that the electric field that is directed to an end member of the ion transfer device (e.g. an inlet of the ion transfer device) whose surface extends in a direction from an axis of the ion transfer device. The electric field can be directed to an inlet of a capillary, with the capillary having a wall thickness greater than a distance between the sample plate and the entrance to the ion transfer device. The electric field can be directed to a disk at an inlet of a capillary, with the disk having an outer diameter greater than a distance between the sample plate and the entrance to the ion transfer device. The electric field can be directed to an inlet of a non-concentric capillary, with the capillary having a wall thickness greater than a distance between the sample target plate and the entrance to the ion transfer device.

In step 104, the ions can be transported in a gas passage of a capillary having a wall thickness that is in a range of at least three times a diameter of the gas passage. The transferring can utilize a pulsed dynamic focusing or a timed-extraction technique. During pulsed dynamic focusing, laser spot areas larger than six times an area of the entrance orifice can be applied. During pulsed dynamic focusing, a laser position that is offset from an entrance axis of the ion transfer device by a distance greater than six times a diameter of the entrance orifice can be applied. During pulsed dynamic focusing, a field strength of the electric field can be reduced prior to the ions drifting in the electric field arriving at the inlet of the ion transfer device. The transferring can occur by flowing a gas into the ion transfer device, by flowing a gas into a capillary tube, by flowing a gas into a non-concentric capillary tube, and/or by flowing a gas into a gas passage of a capillary having a wall thickness that is in a range of at least three times a diameter of the gas passage.

Numerous modifications and variations of the present invention are possible in light of the above teachings. It is therefore to be understood that within the scope of the appended claims, the invention may be practiced otherwise than as specifically described herein.

The invention claimed is:

1. A method for collecting ions into an ion transfer device of a mass spectrometer, comprising:

producing ions from a sample on a sample plate in an ion source;

providing an electric field in an area adjacent the sample whose field strength is at least 50% of a peak field strength between the sample plate and an inlet to the ion transfer device;

receiving said ions into said electric field; and transferring said ions through said ion transfer device to a sampling orifice of the mass spectrometer.

2. The method of claim 1, wherein said producing ions comprises:

producing said ions at atmospheric pressure.

3. The method of claim 1, wherein said producing ions comprises:

producing said ions at pressures above 100 mTorr.

4. The method of claim 1, wherein said producing ions comprises:

producing said ions by laser desorption/ionization of the sample.

5. The method of claim 1, wherein said producing ions comprises:

producing said ions by matrix-assisted laser desorption/ionization of the sample.

6. The method of claim 1, wherein said providing an electric field comprises:

generating an electric field that is directed to a surface of the inlet of the ion transfer device, said surface extending in a direction from an axis of the ion transfer device.

7. The method of claim 6, wherein said providing an electric field comprises:

directing the electric field to a surface that is parallel to a surface of the sample plate holding the sample.

8. The method of claim 6, wherein said generating an electric field comprises:

directing the electric field to the inlet, said inlet connected to a capillary having a wall thickness greater than a distance between the sample plate and the inlet of the ion transfer device.

9. The method of claim 6, wherein said generating an electric field comprises:

directing the electric field to the inlet, said inlet comprising a disk connected to a capillary, and said disk having an outer diameter greater than a distance between the sample plate and the inlet of the ion transfer device.

10. The method of claim 6, wherein said generating an electric field comprises:

directing the electric field to the inlet, said inlet connected to a capillary having a non-concentric passage, and said capillary having a wall thickness greater than a distance between the sample plate and the inlet of the ion transfer device.

11. The method of claim 1, wherein said transferring comprises:

transporting said ions in a gas passage of a capillary having a wall thickness that is in a range of at least three times a diameter of the gas passage.

12. The method of claim 1, wherein said transferring comprises:

utilizing at least one of a pulsed dynamic focusing or a timed-extraction technique.

13. The method of claim 12, further comprising:

applying, during pulsed dynamic focusing, laser spot areas larger than six times an area of an entrance orifice of the inlet to the ion transfer device.

14. The method of claim 12, further comprising:

applying, during pulsed dynamic focusing, a laser position that is offset from an entrance axis of the ion transfer device by a distance greater than six times a diameter of an entrance orifice of the inlet to the ion transfer device.

15. The method of claim 12, further comprising:

reducing a field strength of the electric field prior to the ions arriving at the inlet of the ion transfer device.

16. The method of claim 1, wherein said transferring comprises:

flowing a gas into said ion transfer device.

17. The method of claim 16, wherein said flowing comprises:

flowing said gas into a capillary tube.

18. The method of claim 16, wherein said flowing comprises:

flowing said gas into a capillary tube having a non-concentric passage.

19. The method of claim 16, wherein said flowing comprises:

flowing said gas into a gas passage of a capillary having a wall thickness that is in a range of at least three times a diameter of the gas passage.

20. A method for collecting ions into an ion transfer device of a mass spectrometer, comprising:

producing ions from a sample in an ion source;

providing an electric field that is larger in field strength at the sample than at a point removed from the sample towards an inlet of the ion transfer device;

receiving said ions into said electric field; and transferring said ions through said ion transfer device to the mass spectrometer.

21. The method of claim 20, wherein said producing ions comprises:

producing said ions at atmospheric pressure.

22. The method of claim 20, wherein said producing ions comprises:

producing said ions at pressures above 100 mTorr.

23. The method of claim 20, wherein said producing ions comprises:

producing said ions by laser desorption/ionization of the sample.

24. The method of claim 20, wherein said producing ions comprises:

producing said ions by matrix-assisted laser desorption/ionization of the sample.

25. The method of claim 20, wherein said providing comprises:

generating the electric field in association with a sample plate locating the sample.

26. The method of claim 25, wherein said generating comprises:

generating the electric field in association with metallic protrusions on the sample plate.

27. The method of claim 26, wherein said producing comprises:

producing said ions from a sample located in a vicinity of the metallic protrusions.

28. The method of claim 20, wherein said transferring comprises:

utilizing at least one of a pulsed dynamic focusing or a timed-extraction technique.

29. The method of claim 28, further comprising:

applying, during pulsed dynamic focusing, laser spot areas larger than six times an area of an entrance orifice of the inlet to the ion transfer device.

30. The method of claim 28, further comprising:

applying, during pulsed dynamic focusing, a laser position that is offset from an entrance axis of the ion transfer device by a distance greater than six times a diameter of an entrance orifice of the inlet to the ion transfer device.

31. The method of claim 28, further comprising:

reducing a field strength of the electric field prior to the ions arriving at the inlet of the ion transfer device.

32. The method of claim 20, wherein said transferring comprises:

flowing gas into the ion transfer device.

33. The method of claim 32, wherein said flowing comprises:

flowing the gas in a capillary tube.

34. The method of claim 33, wherein said flowing comprises:

flowing said gas into a capillary tube having a non-concentric passage.

35. The method of claim 33, wherein said flowing comprises:

flowing said gas into a gas passage of the capillary tube having a wall thickness that is in a range of at least three times a diameter of the gas passage.

36. The method of claim 33, wherein said flowing comprises:

flowing said gas in a capillary tube having a wall thickness greater than a distance between the sample plate and the inlet of the ion transfer device.

37. The method of claim 33, wherein said flowing comprises:

flowing said gas through a disk on an inlet of the capillary tube, said disk having an outer diameter greater than a distance between the sample plate and the inlet to the ion transfer device.

38. An apparatus for collecting ions, comprising:

an ion transfer device configured to connect to a sampling orifice of a mass spectrometer, and having an inlet configured to accept ions; and said inlet having an end member with a surface that is substantially parallel to a surface of a sample plate holding the sample and that extends in a direction normal from an axis of the ion transfer device.

39. The apparatus of claim 38, wherein the ion transfer device comprises:

a capillary having a gas passage, said capillary having a wall thickness that is in a range of at least three times a diameter of the gas passage.

40. The apparatus of claim 38, wherein the ion transfer device comprises:

a capillary having a gas passage and a disk at an entrance to the gas passage, said disk forming said end member and having a diameter that is in a range of at least three times a diameter of the gas passage.

41. The apparatus of claim 38, further comprising:

a sample plate configured to locate a sample to be ionized.

42. The apparatus of claim 41, wherein the ion transfer device comprises:

a capillary having a wall thickness greater than a distance between the sample plate and the entrance to the ion transfer device.

43. The apparatus of claim 41, wherein the ion transfer device comprises:

a capillary including a disk at an entrance of the capillary, said disk having an outer diameter greater than a distance between the sample plate and the entrance of the capillary.

44. The apparatus of claim 41, wherein the sample plate comprises:

metallic protrusions extending in a normal direction from the sample plate.

45. The apparatus of claim 44, wherein the sample plate further comprises:

a dielectric covering the metallic protrusions.

46. The apparatus of claim 41, further comprising:

a pulse modulator configured to provide an electric field between the sample plate and the inlet of the ion transfer device.

47. The apparatus of claim 46, wherein the pulse modulator is configured to reduce a field strength of the electric field prior to the ions arriving at the inlet of the ion transfer device.

48. The apparatus of claim 38, further comprising:

an ion generator configured to produce said ions.

49. The apparatus of claim 48, wherein the ion generator comprises:

a sample plate locating a sample to be ionized; and a laser source configured to produce the ions by laser desorption/ionization of the sample.

50. The apparatus of claim 38, wherein the ion transfer device comprises a conical ion transfer device.

51. The apparatus of claim 50, wherein the surface extends in said direction from the axis of the conical ion transfer device at least 3 times a diameter of an entrance to the conical ion transfer device.

52. The apparatus of claim 50, wherein the surface extends to a diameter greater than a distance between a sample plate locating a sample to be ionized and the inlet of the conical ion transfer device.

53. The apparatus of claim 50, wherein said surface comprises:

a disk extending in said direction from the axis of the conical ion transfer device.

54. The apparatus of claim 50, further comprising:

a pulse modulator configured to provide an electric field between a sample plate holding a sample to be ionized and the inlet of the conical ion transfer device.

55. The apparatus of claim 54, wherein the pulse modulator is configured to reduce a field strength of the electric field prior to the ions arriving at the inlet of the conical ion transfer device.

56. A method for collecting ions into an ion transfer device of a mass spectrometer, comprising:

producing ions from a sample in an ion source;

providing an electric field that is directed to an end member of the ion transfer device, said end member having a surface that is substantially parallel to a surface of a sample plate holding the sample and that extends in a direction normal from an axis of the ion transfer device;

receiving said ions into said electric field; and transferring said ions through said conical ion transfer device to the mass spectrometer.

57. The method of claim 56, wherein said producing ions comprises:

producing said ions at atmospheric pressure.

58. The method of claim 56, wherein said producing ions comprises:

producing said ions at pressures above 100 mTorr.

59. The method of claim 56, wherein said producing ions comprises:

producing said ions by laser desorption/ionization of the sample.

60. The method of claim 56, wherein said producing ions comprises:

producing said ions by matrix-assisted laser desorption/ionization of the sample.

61. The method of claim 56, wherein said providing an electric field comprises:

generating an electric field that is directed to a surface of the inlet of the ion transfer device, said surface extending in a direction from an axis of the ion transfer device.

62. The method of claim 61, wherein said generating an electric field comprises:

directing the electric field to the inlet, said inlet connected to a capillary having a wall thickness greater than a distance between the sample plate and the inlet of the ion transfer device.

63. The method of claim 61, wherein said generating an electric field comprises:

directing the electric field to the inlet, said inlet comprising a disk connected to a capillary, and said disk having an outer diameter greater than a distance between the sample plate and the inlet of the ion transfer device.

64. The method of claim 61, wherein said generating an electric field comprises:

directing the electric field to the inlet, said inlet connected to a capillary having a non-concentric passage, and said capillary having a wall thickness greater than a distance between the sample plate and the inlet of the ion transfer device.

65. The method of claim 56, wherein said transferring comprises:

transporting said ions in a gas passage of a capillary having a wall thickness that is in a range of at least three times a diameter of the gas passage.

66. The method of claim 56, wherein said transferring comprises:

utilizing at least one of a pulsed dynamic focusing or a timed-extraction technique.

67. The method of claim 56, wherein said providing an electric field comprises:

directing the electric field to the end member of a conical ion transfer device, said end member extending at least 3 times a diameter of an entrance to the conical ion transfer device.

68. The method of claim 67, wherein said providing an electric field comprises:

directing the electric field to the end member of the conical ion transfer device, said end member having an outer diameter greater than a distance between a sample plate locating the sample and the end member of a conical ion transfer device.

69. The method of claim 67, wherein said directing the electric field comprises:

directing the electric field to a surface of the end member, said surface comprising a disk extending in said direction from the axis of the conical ion transfer device.

70. The method of claim 67, further comprising:

reducing a field strength of the electric field prior to the ions arriving at the inlet of the ion transfer device.

71. An apparatus for collecting ions, comprising:

a sample plate;

an ion transfer device configured to connect to a sampling orifice of a mass spectrometer, and having an inlet configured to accept ions, wherein the inlet and the sample plate are configured such that an applied electric field in an area adjacent the sample plate is at least 50% of a peak field strength between the sample plate and an inlet to the ion transfer device.

72. The apparatus of claim 71, wherein the ion transfer device comprises:

a capillary having a gas passage, said capillary having a wall thickness that is in a range of at least three times a diameter of the gas passage.

73. The apparatus of claim 71, wherein the ion transfer device comprises:

a capillary having a gas passage and a disk at an entrance to the gas passage, said disk forming said end member and having a diameter that is in a range of at least three times a diameter of the gas passage.

74. The apparatus of claim 71, wherein the ion transfer device comprises:

a capillary having a non-concentric passage.

* * * * *